(12) United States Patent
Inoue et al.

(10) Patent No.: US 8,158,246 B2
(45) Date of Patent: Apr. 17, 2012

(54) ULTRALIGHT SOUNDPROOF MATERIAL

(75) Inventors: Toru Inoue, Anjyo (JP); Masaki Ishikawa, Anjyo (JP); Youhei Ishikawa, Anjyo (JP); Sohei Matsuyama, Nukata-gun (JP); Hideyuki Mori, Inuyama (JP)

(73) Assignees: Takehiro Co., Ltd., Anjyo-shi (JP); Toyota Boshoku Corporation, Kariya-shi (JP)

( * ) Notice: Subject to any disclaimer, the term of this patent is extended or adjusted under 35 U.S.C. 154(b) by 282 days.

(21) Appl. No.: 10/551,124

(22) PCT Filed: Mar. 23, 2004

(86) PCT No.: PCT/JP2004/003902
§ 371 (c)(1),
(2), (4) Date: Sep. 26, 2005

(87) PCT Pub. No.: WO2004/086354
PCT Pub. Date: Oct. 7, 2004

(65) Prior Publication Data
US 2006/0201741 A1    Sep. 14, 2006

(30) Foreign Application Priority Data

Mar. 26, 2003  (JP) ................................. 2003-084707
Oct. 29, 2003  (JP) ................................. 2003-368563
Jan. 16, 2004  (JP) ................................. 2004-009569

(51) Int. Cl.
*B32B 3/26*    (2006.01)
*B32B 7/12*    (2006.01)
*B32B 9/00*    (2006.01)

(52) U.S. Cl. ................. 428/304.4; 428/317.1; 428/318.4

(58) Field of Classification Search ............... 428/304.4, 428/318.4, 317.1
See application file for complete search history.

(56) References Cited

U.S. PATENT DOCUMENTS 4,131,664 A * 12/1978 Flowers et al. ............... 264/510
(Continued)

FOREIGN PATENT DOCUMENTS

CN    1235578 A    11/1999
(Continued)

OTHER PUBLICATIONS

EP Office Action of Appln. No. 04722725.1 dated Sep. 30, 2009 in English.

*Primary Examiner* — Victor S Chang
(74) *Attorney, Agent, or Firm* — Antonelli, Terry, Stout & Kraus, LLP.

(57) ABSTRACT

A sound insulator of the invention includes a sound absorption layer 202 and an air-impermeable resonance layer 203, which are bonded to each other via an adhesive layer 204. The sound absorption layer 202 has a thickness in a range of 5 to 50 mm and an area-weight of not greater than 2000 g/m². The sound absorption layer 202 has a two-layer structure of a high-density sound absorption layer 202a and a low-density sound absorption layer 202b, which have different densities. The high-density sound absorption layer 202a is bonded to the air-impermeable resonance layer 203 via the adhesive layer 204 and has a density in a range of 0.05 to 0.20 g/cm³ and a thickness in a range of 2 to 30 mm. The low-density sound absorption layer 202b is bonded to the other face of the high-density sound absorption layer 202a, which is opposite to the air-impermeable resonance layer 203, via an adhesive layer 202c and has a density in a range of 0.01 to 0.10 g/cm³ and a thickness in a range of 2 to 30 mm. The structure of this sound insulator effectively reduces a noise level in a voice-tone frequency band, especially in a high frequency domain, thereby efficiently enhancing the clarity of conversion in a vehicle interior.

8 Claims, 31 Drawing Sheets

U.S. PATENT DOCUMENTS

| | | | |
|---|---|---|---|
| 4,557,970 A | 12/1985 | Holtrop et al. | |
| 4,788,099 A | 11/1988 | Fukushima et al. | |
| 4,966,799 A * | 10/1990 | Lucca et al. | 428/95 |
| 6,145,617 A | 11/2000 | Alts | |
| 6,296,075 B1 | 10/2001 | Gish et al. | |

FOREIGN PATENT DOCUMENTS

| | | |
|---|---|---|
| JP | 63-102925 | 5/1988 |
| JP | 8-209866 | 8/1996 |
| JP | 10-100299 | 4/1998 |
| JP | 10-203268 | 8/1998 |
| JP | 2000-516175 A | 12/2000 |
| JP | 2001-47545 | 2/2001 |
| JP | 2001-347899 | 12/2001 |
| JP | 2001-347900 | 12/2001 |
| JP | 2002-36969 | 2/2002 |
| JP | 2002-178397 | 6/2002 |
| JP | 2002-220009 | 8/2002 |
| JP | 2002-283482 | 10/2002 |
| JP | 2002-347194 | 12/2002 |
| JP | 2003-81028 | 3/2003 |
| JP | 2003-216158 | 7/2003 |

* cited by examiner

FIG. 2

| Material | Area-weight g/m² | Thickness mm | Density g/cm³ | Compression Repulsive Force | | |
|---|---|---|---|---|---|---|
| | | | | Compression Depth 2.5mm N | Compression Depth 5.0mm N | Compression Depth 7.5mm N |
| PET Felt | 625 | 19 | 0.032 | 8 | 19 | 37 |
| PET Felt | 931 | 21 | 0.044 | 10 | 30 | 57 |
| PET Felt | 1220 | 20 | 0.062 | 16 | 53 | 97 |
| PET Felt | 1518 | 21 | 0.072 | 13 | 52 | 115 |
| PET Felt | 2019 | 21 | 0.096 | 14 | 81 | 181 |
| PET Felt | 2511 | 20 | 0.126 | 22 | 153 | 513 |
| PET Felt | 2681 | 19 | 0.141 | 30 | 290 | 777 |
| RSPP | 1063 | 19 | 0.055 | 7 | 24 | 39 |
| RSPP | 1263 | 20 | 0.063 | 13 | 45 | 89 |
| RSPP | 1616 | 20 | 0.081 | 30 | 88 | 158 |
| RSPP | 2161 | 21 | 0.105 | 40 | 137 | 259 |
| RSPP | 2442 | 21 | 0.118 | 50 | 153 | 304 |
| RSPP | 2676 | 21 | 0.127 | 49 | 187 | 363 |
| PUF | 820 | 20 | 0.041 | 18 | 22 | 30 |
| PUF | 802 | 20 | 0.040 | 21 | 29 | 38 |
| PUF | 823 | 19 | 0.043 | 17 | 21 | 27 |
| PUF | 1004 | 21 | 0.048 | 17 | 21 | 26 |

FIG. 10
(a)
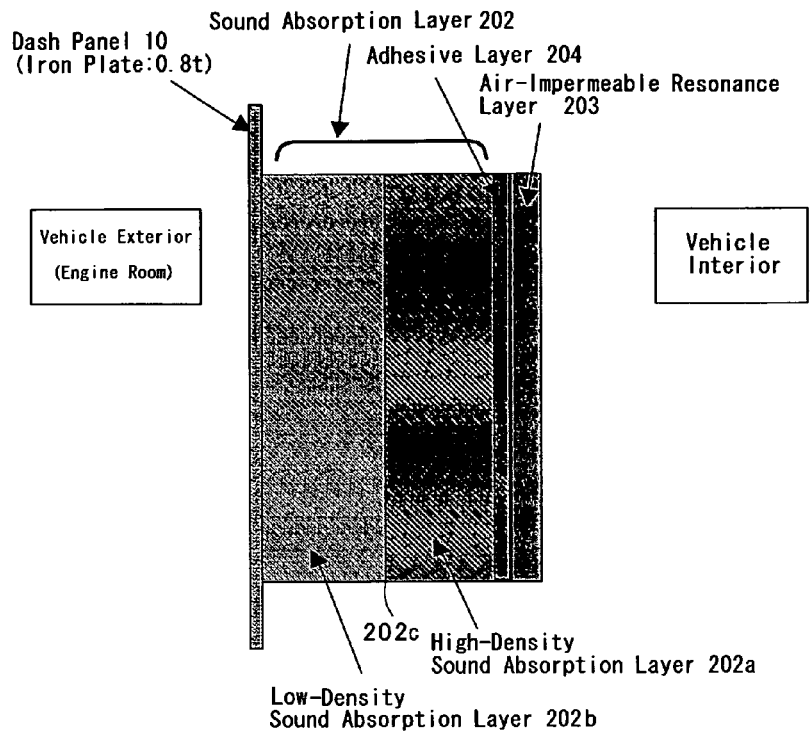
(b)
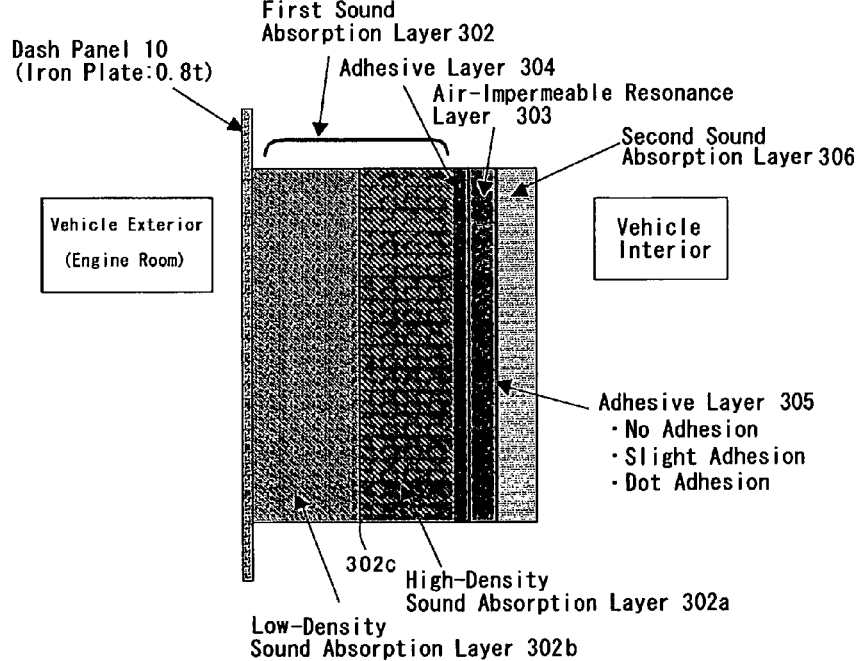

FIG. 21
(a) Comparative Example 1
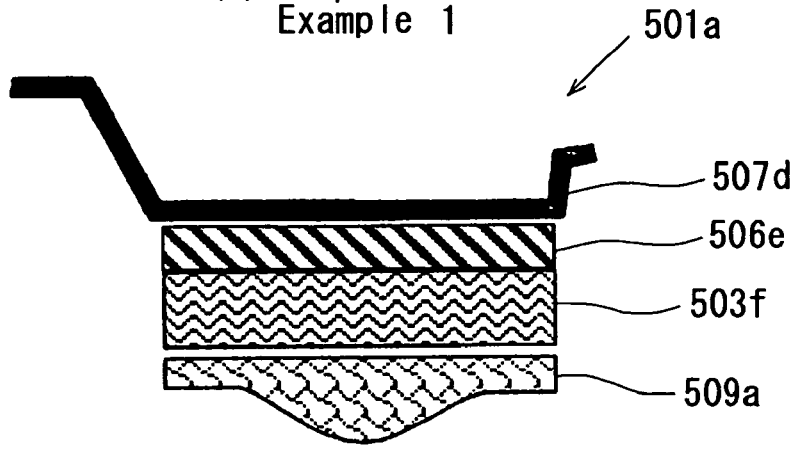
(b) Comparative Example 2 (Structure of Fig. 28)
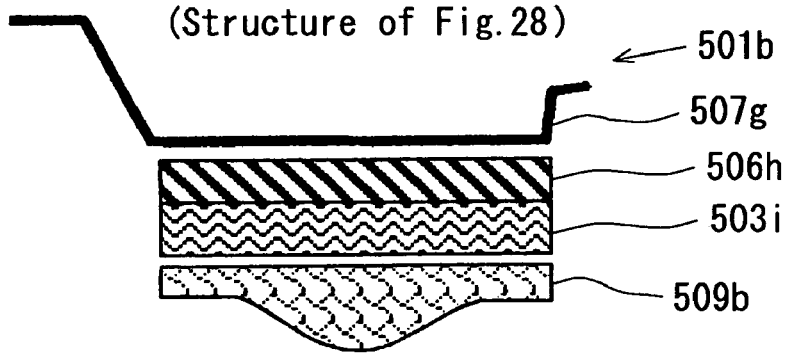
(c) Example of Fifth Embodiment
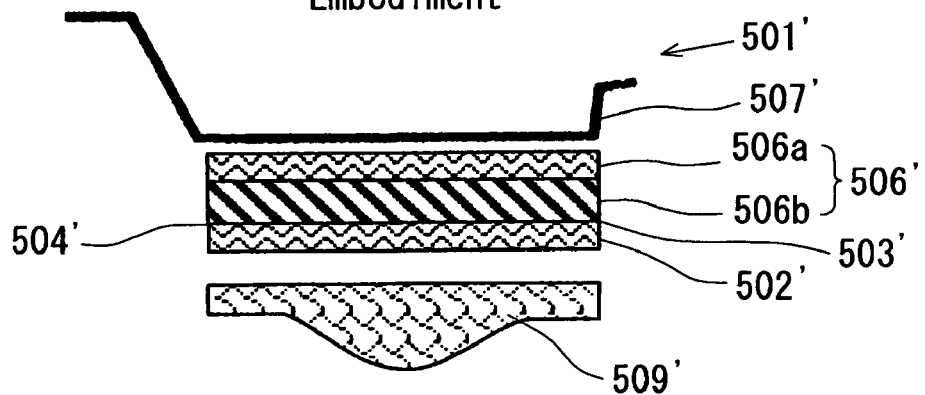

FIG. 22
(a)
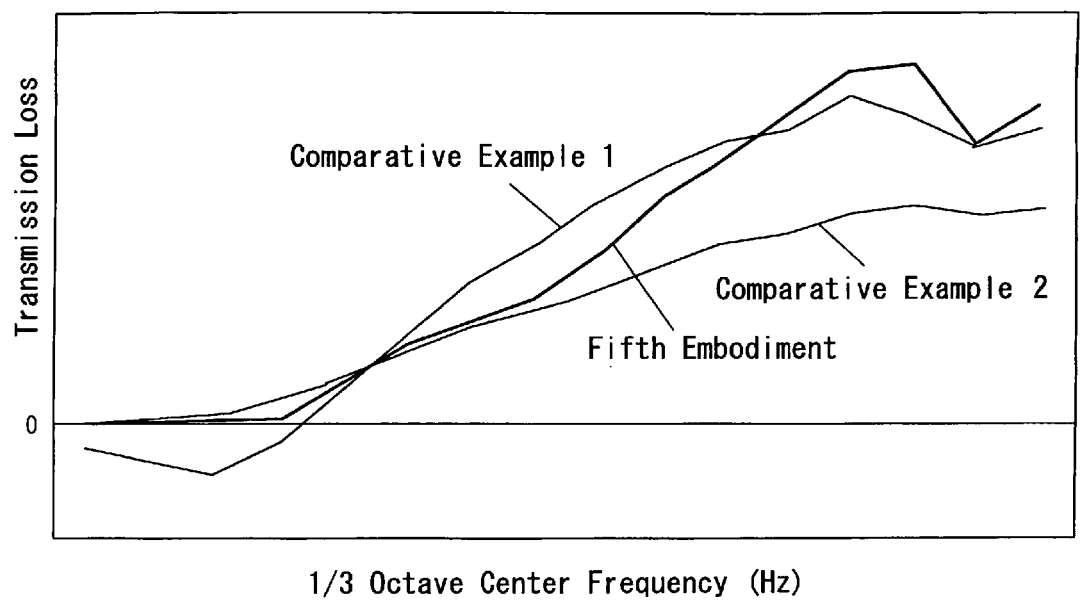
1/3 Octave Center Frequency (Hz)
(b)
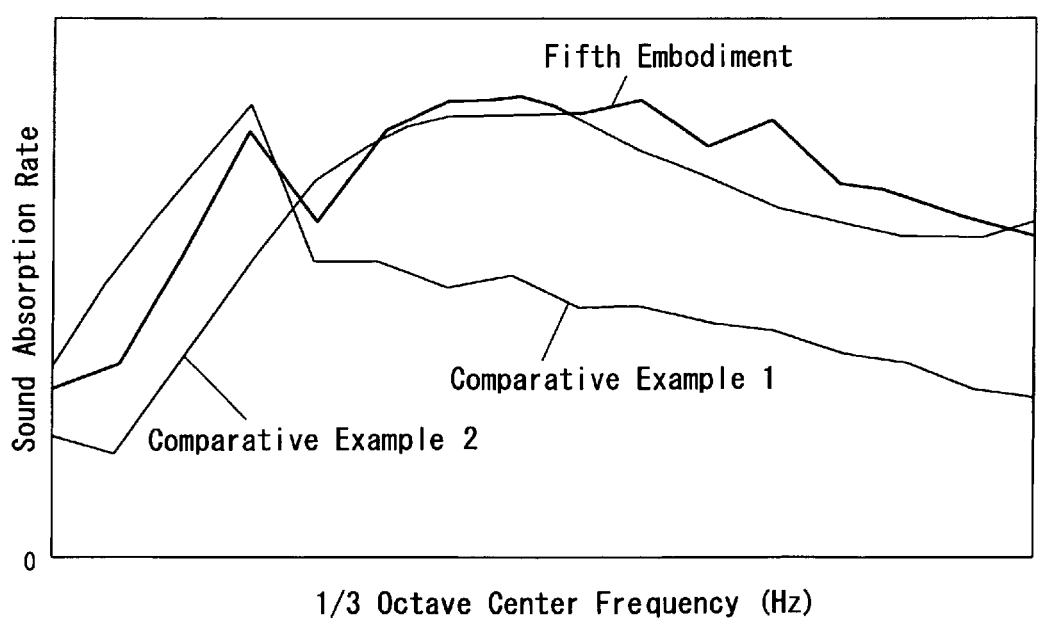
1/3 Octave Center Frequency (Hz)

FIG. 23
(a)
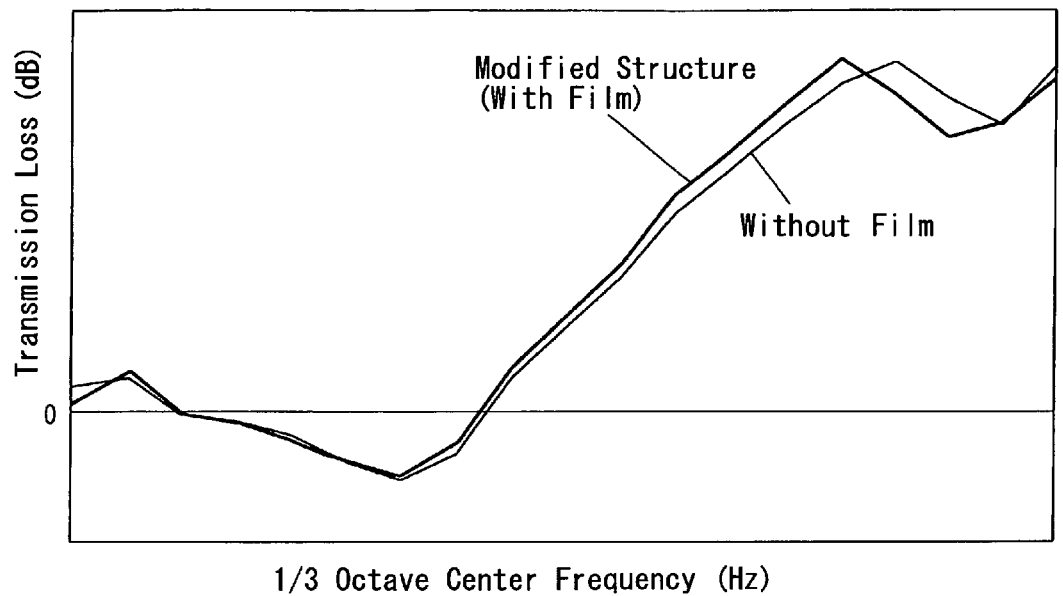
(b)
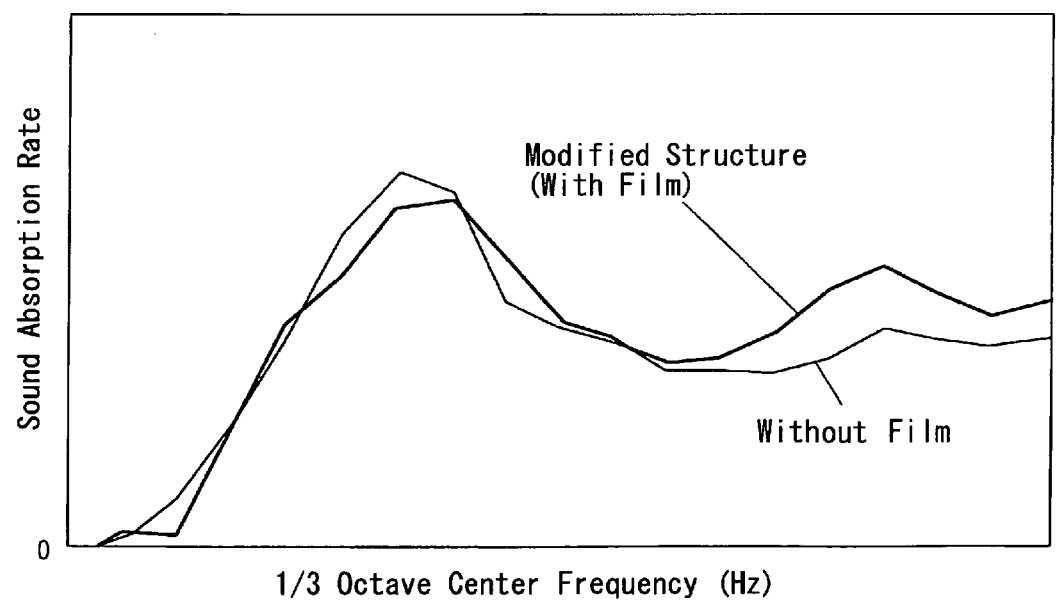

Prior Art Sound Insulation Structure

Structure of Patent Publication Gazette No. 2000-516175

ULTRALIGHT SOUNDPROOF MATERIAL

BACKGROUND OF THE INVENTION

1. Field of the Invention

The present invention relates to an ultra-light sound insulator that prevents propagation of noise and other undesired sound from an engine room or any other vehicle exterior into a vehicle interior. More specifically the invention pertains to an ultra-light sound insulator that is extremely light in weight and effectively absorbs noise and other undesired sound to prevent their propagation into the vehicle interior.

2. Description of the Related Art

Patent Document 1 discloses a multifunctional kit (41), which is used in vehicles to attain noise reduction and heat insulation and more specifically to have sound-absorbing, sound-insulating, oscillation-damping, and heat-insulating effects on floor insulation, end wall insulation, door covering, and roof inner covering. The multifunctional kit (41) includes at least one areal vehicle part (11) and a multi-layer noise-reducing assembly package (42). The assembly package (42) has at least one porous spring layer (13), which is preferably formed from an open-pored foam layer. An air gap (25) is interposed between the assembly package (42) and the areal vehicle part (11). The multi-layer assembly package (42) does not have a heavy-weight layer to give the ultra-light kit (41) suitable for the optimum combination of sound-insulating, sound-absorbing, and oscillation-damping properties. The assembly package (42) also has a micro-porous stiffening layer (14), which preferably consists of an open-pored fiber layer or fiber/foam composite layer. The micro-porous stiffening layer (14) has a total airflow resistance of $R_t=500$ $Nsm^{-3}$ to $R_t=2500$ $Nsm^{-3}$, in particular of $R_t=900$ $Nsm^{-3}$ to $R_t=2000$ $Nsm^{-3}$, and an area-weight (weight per unit area) of $m_F=0.3$ $kg/m^2$ to $m_F=2.0$ $kg/m^2$, in particular of $m_F=0.5$ $kg/m^2$ to $m_F=1.6$ $kg/m^2$. The advantages of this kit are particularly evident with the application of thin steel sheeting, light aluminum sheeting, or organo-sheeting, as is favorably used today in the automobile industry. A further advantage of this kit lies in the extremely low heat conductivity of the applied porous spring layer, which leads to the fact that this kit apart from its good acoustic effectiveness (sound insulation effects) also has good heat insulation.

Patent Document 2 discloses a sound insulator 10 for vehicles. In this prior art sound insulator 10, a first air-permeable sound absorption layer 20, an air-impermeable sound insulation layer 30, and a second air-permeable sound absorption layer 40 are arranged in this order from a vehicle interior 100. The first air-permeable sound absorption layer 20 does not have an air-impermeable layer on the side of the vehicle interior, while the second air-permeable sound absorption layer 40 does not have an air-impermeable layer on the opposite side of the vehicle interior. The sound insulator is light in weight and is designed to effectively reabsorb noise, which has passed through the sound insulator and leaked into the vehicle interior, and to effectively absorb noise incoming from a site other than an engine room into the vehicle interior.

Patent Document 3 discloses an automobile insulator (20) attached to the vehicle interior side of a vehicle body panel (10). The insulator (20) has a mono-layer sound absorption layer (21), the base of which is a fiber molded object. The insulator (20) is constructed as an air-permeable insulator to absorb the noise, which is propagated through the vehicle body panel (10) and enters the sound absorption layer (21), while absorbing reflected noise, which is transmitted through the sound absorption layer (21), is reflected from the inner face of a vehicle interior panel (40), and enters again the sound absorption layer (21) from the surface side. A surface layer (22) of high-density fibers set to have a higher density than the area density of the sound absorption layer (21) is formed on at least one of the surface and the rear face of the sound absorption layer (21). A surface layer (27) of a foamed resin sheet material is also formed to wholly or partly cover at least one of the surface and the rear face of the sound absorption layer (21). This structure excludes the conventional sound insulation layer to reduce the weight, while preventing an increase in sound pressure in the instrument panel (40) to enhance the stillness in the vehicle interior.

Patent Document 4 discloses a laminated object obtained by integrally forming a polyolefin resin foam having a skin peel strength of not greater than 20 N/cm and an L value of not higher than 60 and a bulky non-woven fabric having a thickness of not less than 5 mm and a density of not higher than 50 $kg/cm^3$. The laminated object has an area-weight of not greater than 3 $kg/m^2$. The laminated object is light in weight and easily shaped and has high recyclability and good appearance.

A dash silencer including a surface layer and a sound absorption layer (Patent Document 1+Patent Document 3) has been proposed by taking advantage of the air-flow resistance.

The transmission loss and the sound absorption power of the conventional sound insulation structure are compared with those of the structure disclosed in Patent Document 1. In this discussion, a low frequency domain includes 315 Hz and lower as the ⅓ octave band center frequency. A medium frequency domain includes 400 to 1600 Hz. A high frequency domain includes 2000 Hz and higher.

The transmission loss and the sound absorption power of the conventional sound insulation type structure (see FIG. 27, hereafter referred to as the 'structure of FIG. 27') are compared with those of the structure disclosed in Patent Document 1 (see FIG. 28, hereafter referred to as the 'structure of FIG. 28').

The dash silencer having the structure of FIG. 27 has an area-weight of 6.0 $kg/m^2$, whereas the structure of FIG. 28 has a currently available effective area-weight of 2.0 $kg/m^2$. These products are attached to a vehicle body panel, which has an area-weight of 6.2 $kg/m^2$.

According to the transmission loss curve of FIG. 29($a$), the structure of FIG. 27 has the greater transmission loss than the weight law. This is ascribed to the double-wall structure of the air-impermeable surface layer and the panel and the presence of the intermediate sound absorption material having the air-flow resistance. The high area-weight of rubber sheet, however, causes a significant transmission resonance in a low frequency domain to drastically lower the transmission loss.

According to the transmission loss curve of FIG. 29($a$), the structure of FIG. 28 has the smaller transmission loss than the weight law. The structure of FIG. 28 has also a double-wall structure of the air-permeable surface layer and the panel, however, the surface layer lets air through, and this causes sound leakage in a high frequency domain. The structure of FIG. 28 accordingly does not give sufficient transmission loss for sound insulation.

According to the sound absorption rate curve of FIG. 29($b$), the structure of FIG. 27 has a peak of sound absorption rate, due to strong surface resonance, in a low frequency domain, while only little or substantially no sound absorption rate in the medium to high frequency domain.

According to the sound absorption rate curve of FIG. 29($b$), the structure of FIG. 28 takes advantage of the surface resonance of the surface layer having the high air-flow resistance and the sound absorbing power of the rear sound absorption layer to attain sound absorption power in the medium to high frequency domain.

The indirect noise, which incomes from everywhere of the automobile and is reflected, rather than the direct noise, which directly incomes from the dash panel to the dash silencer, more significantly affects the actual stillness in the vehicle interior. The structure of Patent Document 1 has significantly lowered transmission loss but relatively higher sound absorbing power in a medium to high frequency domain, thus attaining somewhat equivalent stillness in the vehicle interior to the effects of the conventional structure. The structure of Patent Document 1, however, has an advantage of significant weight reduction of a product and has favorably been applied to the recent dash panel structure.

[Patent Document 1] Patent Publication Gazette No. 2000-516175
[Patent Document 2] Patent Laid-Open Gazette No. 2001-347899
[Patent Document 3] Patent Laid-Open Gazette No. 2002-220009
[Patent Document 4] Patent Laid-Open Gazette No. 2002-347194

The automobile of some vehicle structure has large effects of direct noise. The structure of FIG. 28 may give an insufficient transmission loss (see FIG. 29(*a*)) and thus fail to attain the required stillness in the vehicle interior. Additionally, actual products have designed patterns and varying thickness of the sound absorption layer in a range of 1 to 30 mm. The dash silencer having the structure of FIG. 28 disclosed in Patent Document 1 takes advantage of the sound absorbing power of the sound absorption layer in the high frequency domain. Reduction in thickness of the sound absorption layer thus results in the lowered sound absorbing power. Additionally, the sound absorption layer is made of felt having a thickness in a range of 30 to 50 mm. The thin wall portion has the lowered air-flow resistance than the other wall portion and does not give the sufficient sound absorbing power. The dash silencer having the structure disclosed in Patent Document 1 that assures the stillness in the vehicle interior due to sound absorbing power may thus not exert sufficient performances.

The prior art sound insulator is designed to reduce the noise directly incoming from the vehicle exterior and have good sound absorbing power in a wide frequency domain, while not having the sufficient countermeasure to absorb reflected noise in the vehicle interior. As shown in FIG. 30, a ⅓ octave band center frequency domain of 800 to 1600 Hz is essential for the clearness of conversion. The prior art structure has insufficient sound absorption effects at the frequency of about 1000 Hz, which is important for cleanness of conversation.

In the sound insulator of Patent Document 2, the sound absorbing power of the sound absorption material is used to absorb sound in a frequency domain of not lower than 1000 Hz, as shown in FIG. 31. The reduced thickness of the sound absorption layer thus tends to lower the sound absorption rate.

The sound insulator having the structure of FIG. 28 functions to absorb reflected sound in the vehicle interior, but there is no clear method of regulating the sound absorption frequency.

The prior art sound insulators disclosed in Patent Documents 3 and 4 have not given any consideration to the effects of the restricting state at the interface between the sound absorption layer and the surface layer and the air permeation of the surface layer on the sound absorption characteristics and the sound insulation characteristics. Actual products have complicated shapes and require the interfacial adhesion strength. The prior art sound insulators may thus have different sound absorption and sound insulation characteristics from designed conditions and may not be usable in limited spaces.

SUMMARY OF THE INVENTION

The object of the invention is thus to enhance sound insulation from direct noise incoming from a vehicle panel and more specifically to raise transmission loss in a medium to high frequency domain generally having less transmission loss. The object of the invention is also to ensure sufficient sound absorption even in a thin-wall sound absorption layer of an actual odd-shaped product and more specifically to enhance sound absorbing power in the medium frequency domain (including a noise level of a voice-tone frequency domain) to high frequency domain. The object of the invention is further to enhance sound absorbing power in a frequency domain of 315 to 800 Hz generally having poor sound absorption. The object of the invention is also to reduce the weight of a sound insulator.

In order to attain the above and the other related objects, the inventor of this invention has found the optimum conditions of adhesion at an interface between a sound absorption layer and an air-impermeable resonance layer and has significantly reduced the weight of the air-impermeable resonance layer. The transmission loss and the sound absorbing rate in the relevant frequency domain are regulated in order to ensure sufficient sound insulation from noise incoming from a vehicle exterior and sufficient sound absorption in the vehicle interior, and thereby improve the stillness in the vehicle interior.

The invention recited in claim 1 is thus directed to an ultra-light sound insulator, which includes: a sound absorption layer that is light in weight and has a thickness in a range of 1 to 100 mm, a density in a range of 0.01 to 0.2 g/cm$^3$ or more preferably in a range of 0.03 to 0.08 g/cm$^3$; and an air-impermeable resonance layer that is bonded to the sound absorption layer via an adhesive layer and has an area-weight (weight per unit area) of not greater than 600 g/m$^2$ or more preferably of not greater than 300 g/m$^2$. An adhesion strength of the adhesive layer against the sound absorption layer and the air-impermeable resonance layer is set in a range of 1 to 20 N/25 mm or more preferably in a range of 3 to 10 N/25 mm under conditions of a peel angle of 180 degrees and a peel width of 25 mm. An adhesion area of the adhesive layer is 50 to 100% or more preferably 80 to 100% of a whole interface between the sound absorption layer and the air-impermeable resonance layer. The sound absorption layer faces to a vehicle body panel, while the air-impermeable resonance layer faces to a vehicle interior.

The peeling method is in conformity with 'JIS K6854, FIG. 4: 180-degree peel' and adopts a peeling rate of 200 mm/minute.

The air-impermeable resonance layer and the sound absorption are bonded to each other with a sufficient adhesion force by means of the adhesive layer at the interface. The sound insulator of the invention takes advantage of the resonance of the sound absorption layer and the air-impermeable resonance layer at the interface to ensure sufficient sound absorption. The air permeability is measured with a Frazil-type air permeability tester in conformity with JIS L1018 8.3.3.1 concerning air permeability of knitted fabrics or an equivalent air permeability tester having extremely high correlativity. The material is determined as air impermeable when the measurement result is not greater than 0.1 cm$^3$/cm$^2$·sec, which is the lowest measurable limit. The sound absorption layer preferably includes an air layer.

The inventor of the present invention has completed the invention, based on the finding that the peel strength and the adhesion area of the adhesive layer that indicate the state of the interface between the air-impermeable resonance layer and the sound absorption layer affects the sound absorbing power. The ultra-light sound insulator of the invention takes advantage of the resonance at the interface between the air-impermeable resonance layer and the sound absorption layer to enhance the sound absorbing power. The presence of the adhesive layer interposed between the air-impermeable resonance layer and the sound absorption layer effectively regulates the frequency of sound absorbed at the interface. The sound in the vehicle interior is absorbed by membrane resonance of the air-impermeable resonance layer and the sound absorption layer.

The air-impermeable resonance layer may be formed over the whole face or partial face of the sound absorption layer or may be formed on either the surface or the rear face of the sound absorption layer.

The structure of the ultra-light sound insulator includes the sound absorption layer and the air-impermeable resonance layer (for example, an air-impermeable thin film layer or an ultra-light air-impermeable foam layer), which faces to the vehicle interior. The sound absorption layer and the adhesive layer may be air impermeable or air permeable. The sound absorption layer may be made of an air-permeable material or an air-impermeable material, as long as the material ensures sufficient sound absorbing power. For example, both air-permeable and air-impermeable polyurethane molds are applicable to the material of the sound absorption layer.

The adhesion area of the adhesive layer is 50 to 100% or preferably not less than 80% of the whole interface between the air-impermeable resonance layer and the sound absorption layer. The adhesion area may cover the whole interface or the partial interface. It is desirable that the sound absorption layer is continuously bonded to the air-impermeable resonance layer via the adhesive layer. Dot adhesion at a density of 1 to 50 dots/cm$^2$ or thread adhesion may be adopted. An adhesive film may also be applied for adhesion of the whole interface.

The adhesion strength is set in a range of 1 to 20 N/25 mm or more preferably in a range of 3 to 10 N/25 mm under the conditions of a peel angle of 180 degrees and a peel width of 25 mm.

The air-impermeable resonance layer is made of an air-impermeable material, for example, a resin foam or a resin film. The sound absorption layer is made of either an air-impermeable material or an air-permeable material, for example, a thermoplastic felt of reused synthetic fibers or PET fibers with binder fibers. The adhesive layer is made of either an air-impermeable material or an air-permeable material, for example, ethylene vinyl acetate copolymer (EVA) or polyurethane adhesive.

The sound absorption layer of the invention recited in claim 2 is an ultra-light sound insulator that has a multi-layer structure of a high-density sound absorption layer and a low-density sound absorption layer.

An invention recited in claim 3 is an ultra-light sound insulator in accordance with claim 2, wherein the high-density sound absorption layer has a density in a range of 0.05 to 0.20 g/cm$^3$ and a thickness in a range of 2 to 70 mm, and the low-density sound absorption layer has a density in a range of 0.01 to 0.10 g/cm$^3$ and a thickness in a range of 2 to 70 mm.

An invention recited in claim 4 is an ultra-light sound insulator in accordance with either one of claim 2 and 3, wherein the high-density sound absorption layer has an initial compression repulsive force in a range of 30 to 600 N or more preferably in a range of 50 to 300 N, and the low-density sound absorption layer has an initial compression repulsive force in a range of 5 to 300 N or more preferably in a range of 10 to 100N and the initial compression repulsive force of the high-density sound absorption layer is at least 1.2 to 40 times the initial compression repulsive force of the low-density sound absorption layer and the high-density sound absorption layer has a thickness occupying 20 to 80% of the thickness of the sound absorption layer, more preferably the initial compression repulsive force of the high-density sound absorption layer is 1.5 to 5 times the initial compression repulsive force of the low-density sound absorption layer and the high-density sound absorption layer has a thickness occupying 40 to 60% of the thickness of the sound absorption layer.

The compression initial repulsive force and the thickness of the high-density sound absorption layer affect the spring in a spring-mass vibration system. Adhesion of the high-density sound absorption layer having the higher initial repulsive force to the air-impermeable resonance layer via the adhesive layer enhances the rigidity of the air-impermeable resonance layer and shifts the resonance frequency to the higher frequency. The high-density sound absorption layer and the low-density sound absorption layer are required to have an adequate difference of rigidity to induce the resonances in desired high frequency domain and low frequency domain.

Each sound absorption material used for the sound absorption layer is trimmed to a cylindrical sample of 100 mm φ and 20 mm in thickness for measurement of the initial compression repulsive force.

FIG. 1 shows a method of measuring the initial compression repulsive force, where a load is applied to compress a cylindrical sample (100 mm φ) of each sound absorption material.

As shown in FIG. 1, a load is applied onto the top face of the sample, and the repulsive force under the condition of a compression to a depth of 5 mm is measured with a load tester like a Tensilon tester. The loading speed is 50 mm/minute. For the purpose of reference, the repulsive force is measured under the conditions of a compression to a depth of 2.5 mm and a compression to a depth of 7.5 mm.

FIG. 2 is a table showing results of measurement of the initial compression repulsive force with regard to PET (polyethylene terephtalate) felt, RSPP (reused sound insulating material made from shredder dust), and PUF (polyurethane foam). The compression repulsive force of the sound absorption layer is related to the elastic modulus of a damping material. The felt conventionally used as a kind of sound insulating materials is a kind of damping materials. The damping material absorbs vibration energy and converts the absorbed vibration energy into thermal energy. A loss coefficient η is a factor showing the damping effect. The loss coefficient η is expressed by Equation 1 given below:

$$\eta = \eta' \times \frac{E2}{E1} \times \left[\frac{h2}{h1}\right]^2 \qquad \text{[Equation 1]}$$

η: Loss coefficient

η': Loss coefficient of sound absorption layer

E1: Elastic modulus of resonance layer

E2: Elastic modulus of sound absorption layer h1: Thickness of resonance layer h2: Thickness of sound absorption layer It is preferable that the sound absorption layer has a two-layer structure including a high-density sound absorption layer and a low-density sound absorption layer of different materials. Another preferable example of the sound absorption layer is made of a single material having a density gradient from a higher density to a lower density.

Preferably, the sound absorption layer made of the two-layer structure of different materials is a combination of a higher-density sound absorption material with a lower-density sound absorption material. The mono-layer structure having the density gradient from a higher density to a lower density exerts the similar effects to those of the two-layer structure, when its higher density side is bonded to the air-impermeable resonance layer via the adhesive layer.

For example, one face of the high-density sound absorption layer may be bonded to the air-impermeable resonance layer via the adhesive layer, while one face of the low-density sound absorption layer is bonded via another adhesive layer to or laid on the other face of the high-density sound absorption layer, which is opposite to the air-impermeable resonance layer. For another example, mono-layer structure having the density gradient from a higher density to a lower density may also be used.

Preferable materials for the sound absorption layer include thermoplastic felts, polyester felts like PET (polyethylene terephtalate) felt, polyurethane molds, polyurethane foam slubs, and RSPP.

An invention recited in claim 5 is an ultra-light sound insulator in accordance with claim 1, wherein the sound absorption layer has a mono-layer structure and has a density in a range of 0.02 to 0.20 g/cm$^3$ and a thickness in a range of 2 to 70 mm. It is preferable that the sound absorption layer is made of a single material.

An invention recited in claim 6 is an ultra-light sound insulator in accordance with claim 5, wherein the sound absorption layer has an initial compression repulsive force in a range of 2 to 200 N or more preferably in a range of 20 to 100 N.

An invention recited in claim 7 is an ultra-light sound insulator in accordance with any one of the claims 1 through 6, wherein a second sound absorption layer is bonded to the other face of the air-impermeable resonance layer, which is not in contact with the adhesive layer but faces to the vehicle interior, and the second sound absorption layer has a density in a range of 0.01 to 0.2 g/cm$^3$ or more preferably in a range of 0.05 to 0.15 g/cm$^3$ and a thickness in a range of 1 to 20 mm or more preferably in a range of 4 to 10 mm.

Any method may be adopted to fix the second sound absorption layer to the air-impermeable resonance layer. One method does not use any adhesive but simply lays the second sound absorption layer on the air-impermeable resonance layer. For example, the second sound absorption layer, the resonance layer, and the sound absorption layer are fixed via a fastener (not shown) to a vehicle body panel like a dash panel or a floor panel. Another method is local adhesion like dot adhesion at a pitch of 20 to 100 mm. Still another method is overall adhesion via an adhesive layer. The adhesion strength of the second sound absorption layer to the air-impermeable resonance layer is in a range of 0.1 to 20 N/25 mm or more preferably in a range of 3 to 10 N/25 mm under the conditions of a peel angle of 180 degrees and a peel width of 25 mm. The second sound absorption layer may be formed to cover over the whole single face of the air-impermeable resonance layer, or may be formed only at a site of high noise reflection in the vehicle interior according to the requirements. The second sound absorption layer may have a mono-layer structure or a multi-layer structure. The multiple layers of the second sound absorption layer may be joined together by adhesion. Multiple sound absorption layers may be joined by an adhesive agent, an adhesive film, or by mechanical bonding, such as mechanical needle punching force.

An invention recited in claim 8 is an ultra-light sound insulator in accordance with claim 7, wherein the second sound absorption layer has either of a mono-layer structure and a multi-layer structure.

An invention recited in claim 9 is an ultra-light sound insulator in accordance with either one of claim 7 and 8, wherein the second sound absorption layer has a multi-layer structure of a lower layer and an upper layer. The lower layer of the second sound absorption layer may be bonded to the air-impermeable resonance layer or otherwise the upper layer and the lower layer of the second sound absorption layer may be laid one upon the other by means of a mechanical boring force. More precisely, it is preferable that a lower layer of the second sound absorption layer is bonded to a film resonance layer or an upper film layer and a lower felt layer are laid one upon the other by needle punching.

An invention recited in claim 10 is an ultra-light sound insulator in accordance with any one of claims 1 through 9, wherein the air-impermeable resonance layer is either of a foam and a film, and the air-impermeable resonance layer has a thickness in a range of 1 to 7 mm or more preferably in a range of 2 to 3 mm in the case of the foam, while having a thickness in a range of 10 to 600 μm or more preferably in a range of 20 to 300 μm in the case of the film.

The sound absorption layer is made of a low-density air-impermeable or air-permeable material and has sound absorbing power. The air-impermeable resonance layer is required to be sufficiently light in weight for the resonance at a low pitch or with low vibration energy.

Preferable materials for the air-impermeable resonance film layer include olefin resin films, polyester films like polyethylene terephthalate (PET) film, polyurethane resin films, and their combinations. Preferable materials for the independent air-impermeable resonance foam include olefin foams like polypropylene foam (PPF) and polyethylene foam (PEF).

The ultra-light sound insulator of the invention has the especially good sound absorbing power in the frequency band of 1000 to 1600 Hz for the improved clarity of conversation. This is ascribed to a continuous, arbitrary variation in thickness of the sound absorption layer. The structure of the invention effectively improves sound absorption by the sheet resonance in this frequency band, thus ensuring the favorable stillness in the vehicle interior. The ultra-light sound insulator of the invention has the less thickness but takes advantage of the sheet resonance to ensure the high sound absorption rate.

The structure of the invention significantly reduces the weight of the air-impermeable resonance layer, compared with the prior art sound absorber. In the ultra-light sound insulator of the invention, the air-impermeable resonance layer has an area-weight of not greater than 600 g/m$^2$ or more preferably of not greater than 300 g/m$^2$. The air-impermeable resonance layer is either a foam or a film and has a thickness in a range of 1 to 7 mm or more preferably in a range of 2 to 3 mm in the case of the foam, while having a thickness in a range of 10 to 600 μm or more preferably in a range of 20 to 300 μm in the case of the film.

The conventional sound insulator has an area-weight in a range of 4000 to 10000 g/m$^2$, and the conventional sound absorber has an area-weight in a range of 500 to 2000 g/m$^2$. In the ultra-light sound insulator of the invention, on the other hand, the air-impermeable resonance layer has an area-weight of not greater than 200 g/m$^2$.

The adhesive layer has a thickness in a range of 1 to 100 μm or more preferably in a range of 5 to 50 μm and an area-weight in a range of 5 to 200 g/m$^2$ or more preferably in a range of 10 to 100 g/m$^2$. The adhesive layer may have any arbitrary density.

The terminology 'whole interface' means the whole interface where the air-impermeable resonance layer and the sound absorption layer can be joined by adhesion. Here S1 and S2 denote the area of the air-impermeable resonance layer and the sound absorption layer. In the case of S1=S2, the area of the whole interface S=S1=S2. In the case of S1>S2, the area of the whole interface S=S2. In the case of S1<S2, the area of the whole interface S=S1. The terminology 'peel' means release of the sound absorption layer from the bonded air-impermeable resonance layer under preset measurement conditions. The peeling state may represent surface destruction of the material (for example, surface destruction of the felt), interfacial release of the adhesive (for example, release with the adhesive entirely left on the sound absorption layer), cohesive release of the adhesive (for example, release with the adhesive in the threading state left on both the sound absorption layer and the air-impermeable resonance layer), or a combination of surface destruction of the material, interfacial release of the adhesive, and cohesive release of the adhesive.

BRIEF DESCRIPTION OF THE DRAWINGS

FIG. 2 is a table showing results of measurement of the initial compression repulsive force;

FIG. 10(a) shows the basic structure of a dash silencer 201 (having a varying-density, two-layer sound absorption layer) in a second embodiment of the invention;

FIG. 10(b) shows the basic structure of a dash silencer 301 (having a second sound absorption layer bonded to an air-impermeable resonance layer) in a third embodiment of the invention;

FIGS. 21(a), 21(b), and 21(c) respectively show the basic structure of Comparative Example 1, the basic structure of Comparative Example 2, and the basic structure of Example of the fifth embodiment;

FIG. 22(a) is a graph showing frequency-transmission loss curves with regard to the respective structures of FIGS. 21(a) through 21(c);

FIG. 22(b) is a graph showing frequency-sound absorption rate curves with regard to the respective structures of FIGS. 21(a) through 21(c);

FIG. 23(a) is a graph showing frequency-transmission loss curves with and without a film in a modified structure of the fifth embodiment;

FIG. 23(b) is a graph showing frequency-sound absorption rate curves with and without a film in the modified structure of the fifth embodiment;

DESCRIPTION OF THE PREFERRED EMBODIMENTS

The ultra-light sound insulator of the invention is discussed below as first through six embodiments with reference to the accompanying drawings.

First Embodiment

Figure 1:
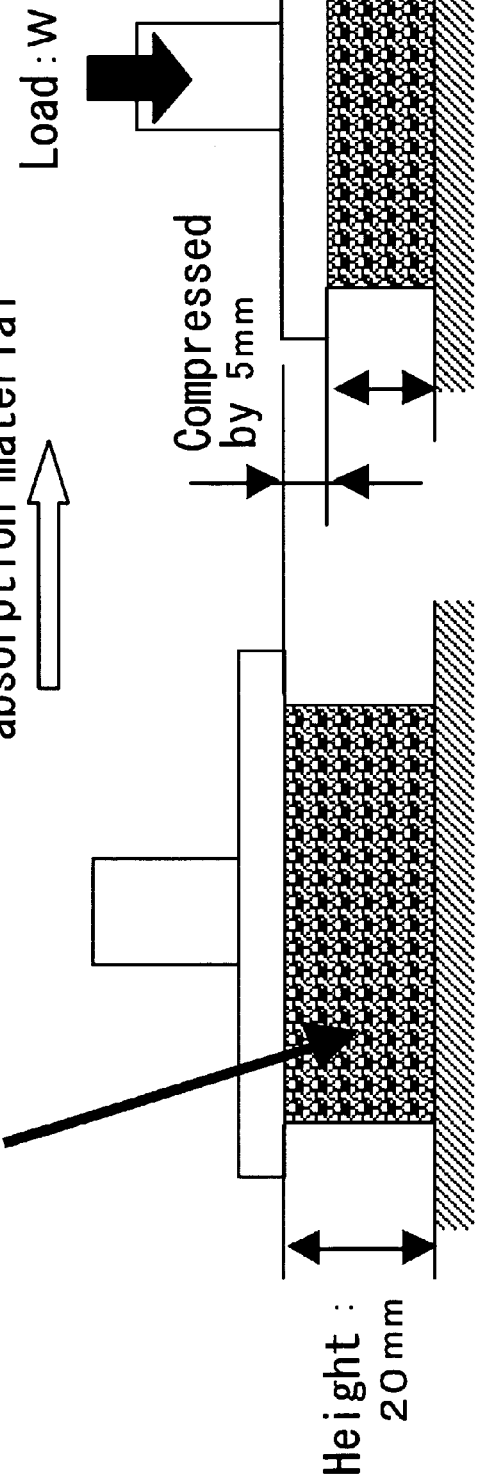
FIG. 1 shows a method of measuring initial compression repulsive force.
Figure 3:
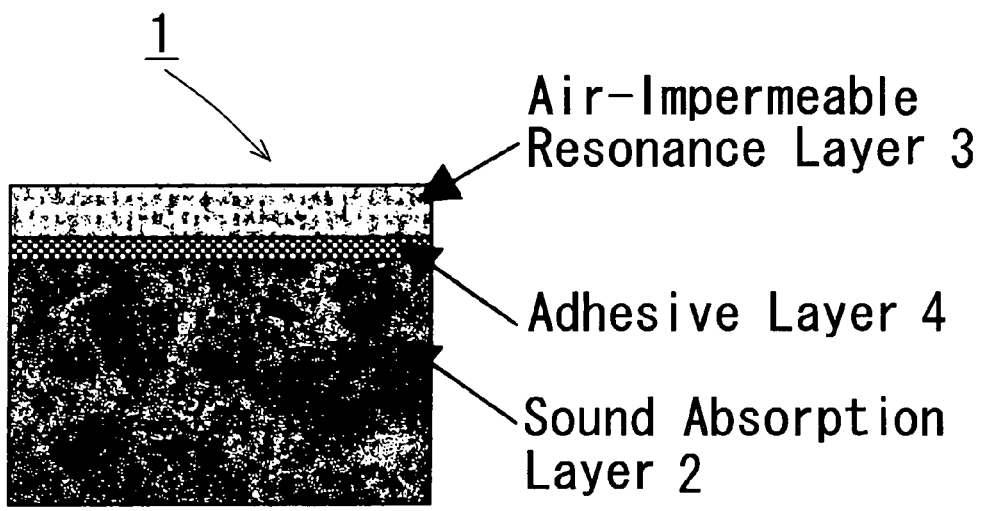
FIG. 3 shows the basic structure of a dash silencer 1 in a first embodiment of the invention.

As shown in FIG. 3, a dash silencer 1 of a first embodiment has a two-layer structure of a sound absorption layer 2 and an air-impermeable resonance layer 3. The sound absorption layer 2 has an air permeability in a range of 10 to 50 cm$^3$/cm$^2$·sec in the case of thermoplastic felt or an air permeability of not greater than 10 cm$^3$/cm$^2$·sec in the case of polyurethane foam. An adhesive layer 4 is interposed between the sound absorption layer 2 and the air-impermeable resonance layer 3 for bonding the two layers 2 and 3 to each other. The dash silencer 1 takes advantage of resonance at the interface between the sound absorption layer 2 and the air-impermeable resonance layer 3 for sound absorption.

Figure 4:
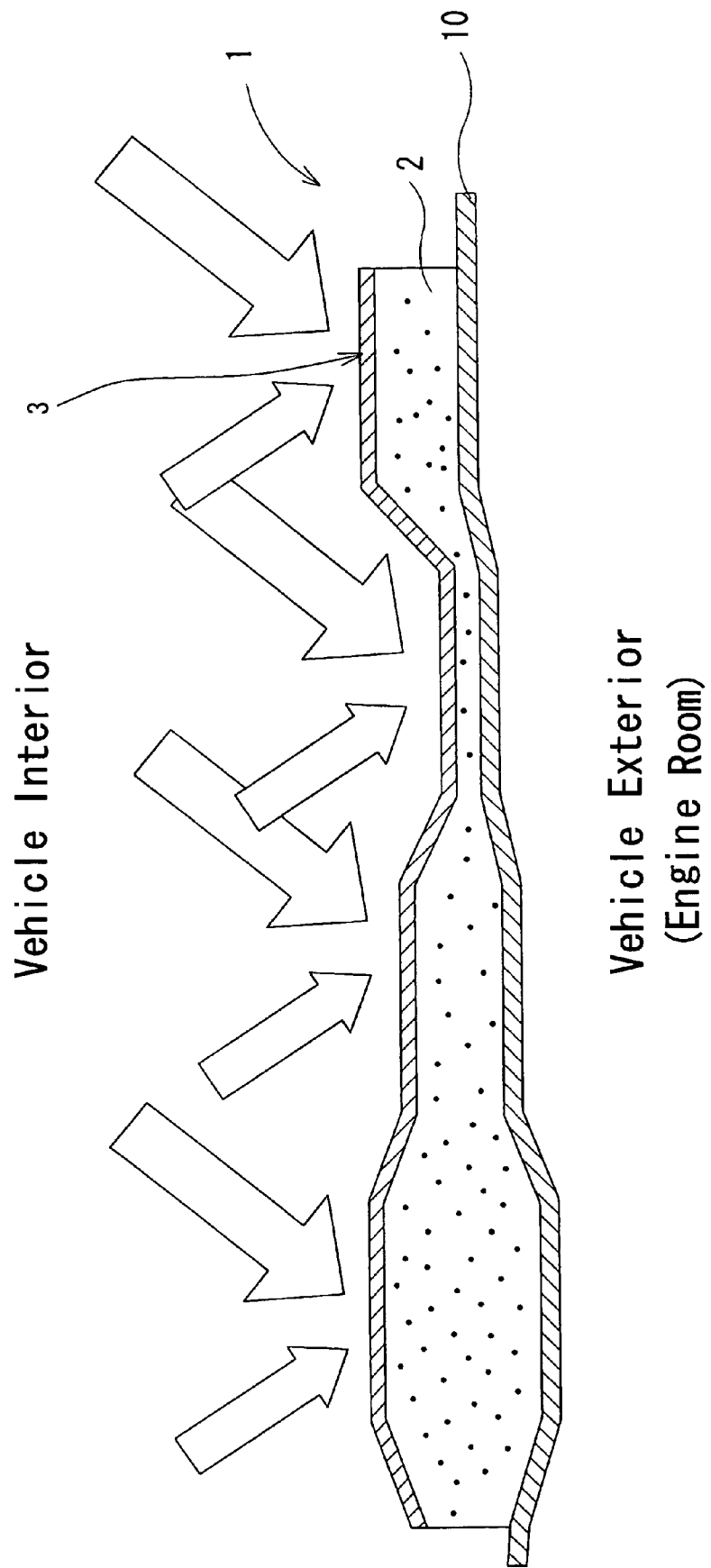
FIG. 4 is a sectional view showing a dash panel with the dash silencer 1 attached thereto.

As shown in FIG. 4, an iron dash panel 10 parts a vehicle interior from a vehicle exterior (an engine room), and the dash silencer 1 of the first embodiment is formed along the inner surface of the vehicle interior. The dash silencer 1 is designed to be ultra light in weight for the enhanced fuel efficiency and the easy attachment but to still have sufficient sound absorption properties.

FIG. 4 shows the dash silencer 1 of the first embodiment. The vehicle interior, the air-impermeable resonance layer 3, the adhesive layer 4, the sound absorption layer 2, the dash panel 10 as the vehicle body, and the vehicle exterior are arranged in this order. The sound absorption layer 2 faces to the dash panel 10, whereas the air-impermeable resonance layer 3 faces to the vehicle interior. The sound absorption layer 2 is bonded to the dash panel 10. An augmentation material may be interposed between them.

The sound absorption layer 2 is formed along the face of the dash panel 10. The sound absorption layer 2 has an arbitrary varying thickness of not greater than 50 mm or more preferably in a range of 5 to 40 mm, an area-weight (weight per unit area) in a range of 500 to 2000 g/m$^2$ or more preferably in a range of 1000 to 1600 g/m$^2$, a density in a range of 0.01 to 0.2 g/cm$^3$ or more preferably in a range of 0.03 to 0.08 g/cm$^3$, and an initial compression repulsive force in a range of 2 to 200 N or more preferably in a range of 20 to 100 N. A compression molded part to a local thickness of 1 mm has an extremely high density of 0.5 g/cm$^3$. This part lowers the sound absorbing power but ensures the sound insulating power according to the weight law.

The sound absorption layer 2 is made of either an air-permeable material or an air-impermeable material. A preferable material for the sound absorption layer 2 is thermoplastic felt of reused synthetic fibers or PET fibers with binder fibers. One method of molding the sound absorption layer 2 adds a low melting-point PET resin as a binder to regenerated PET fibers, aggregates the mixture on a conveyor belt in a mat shape, heats and presses the mixture to a desired mat shape, heats and softens the whole mat, and molds the softened mat to a desired shape along the face of the dash panel 10 by a cold press metal mold having a desired mold shape. When a thermosetting resin is used as the binder, the fibers impregnated with the thermosetting resin are formed to a desired shape by hot pressing. The binder may be any of thermoplastic resins and thermosetting resins. The material and the molding method are not restrictive, as long as the material is collective fibers having excellent sound absorbing properties.

As shown in FIG. 4, the sound absorption layer 2 arbitrarily varies its thickness in the range of not greater than 50 mm, thereby varying the thickness of the dash silencer 1.

The randomly varying thickness of the sound absorption layer 2 effectively absorbs sound in a wide frequency band of 315 to 4000 Hz as a whole.

The air-impermeable resonance layer 3 is formed on the sound absorption layer 2 and faces to the vehicle interior. The air-impermeable resonance layer 3 absorbs sound in the vehicle interior mainly by the membrane resonance with the sound absorption layer 2. The air-impermeable resonance layer 3 is made of either air-impermeable resonance film or air-impermeable independent resonance foam. The air-impermeable resonance layer 3 has an area-weight of not greater than 200 g/m$^2$ or more preferably of not greater than 100 g/m$^2$. The air-impermeable resonance layer 3 has a thickness in a range of 1 to 7 mm or more preferably in a range of 2 to 3 mm in the case of the foam, while having a thickness in a range of 10 to 200 μm or more preferably in a range of 20 to 100 μm in the case of the film. The air-impermeable resonance layer 3 has a density in a range of 0.02 to 0.1 g/cm$^3$ or more preferably in a range of 0.03 to 0.06 g/cm$^3$ in the case of the foam, while having a density in a range of 0.9 to 1.2 g/cm$^3$ or more preferably in a range of 0.9 to 1.0 g/cm$^3$ in the case of the film.

Preferable materials for the air-impermeable resonance layer 3 include olefin resin films, polyester films like polyethylene terephthalate (PET) film, polyurethane resin films, and their combinations. Preferable materials for the air-impermeable resonance foam include olefin foams like polypropylene foam (PPF) and polyethylene foam (PEF).

The adhesive layer 4 has an area-weight in a range of 5 to 200 g/m$^2$ or more preferably in a range of 10 to 100 g/m$^2$ and a thickness in a range of 1 to 100 μm or more preferably in a range of 5 to 50 μm. The density of the adhesive layer 4 is not restricted but may be equivalent to a typical value of adhesives. The adhesion strength of the adhesive layer 4 is in a range of 1 to 20N/25 mm or more preferably in a range of 3 to 10N/25 mm. The rate of the adhesion area is 50 to 100% or more preferably 80 to 100%. The adhesion area may cover the whole interface or the partial interface. For example, the sound absorption layer 2 may continuously be bonded to the air-impermeable resonance layer 3 via the adhesive layer 4. Dot adhesion at a density of 1 to 50 dots/cm$^2$ or thread adhesion may be adopted. An adhesive film may be applied for adhesion of the whole interface. Available materials for the adhesive layer 4 include ethylene vinyl acetate (EVA) resins, polyurethane resins, chloroprene rubber (CR) latexes resins, styrene-butadiene copolymer rubbers (SBR) resins, acryl resins, and olefin resins. It is, however, not desirable to use any material having weaker adhesive force than a required level to sufficiently fix the air-impermeable resonance layer 3 to the sound absorption layer 2.

Lamination by a carding machine or a random film making machine may be used for formation of the sound absorption layer 2 and the air-impermeable resonance layer 3. The adhesion plane of the sound absorption layer 2 to the air-impermeable resonance layer 3 requires smooth finishing. This assures the sufficient adhesion area and efficiently fixes the air-impermeable resonance layer 3 to the sound absorption layer 2.

Figure 5:
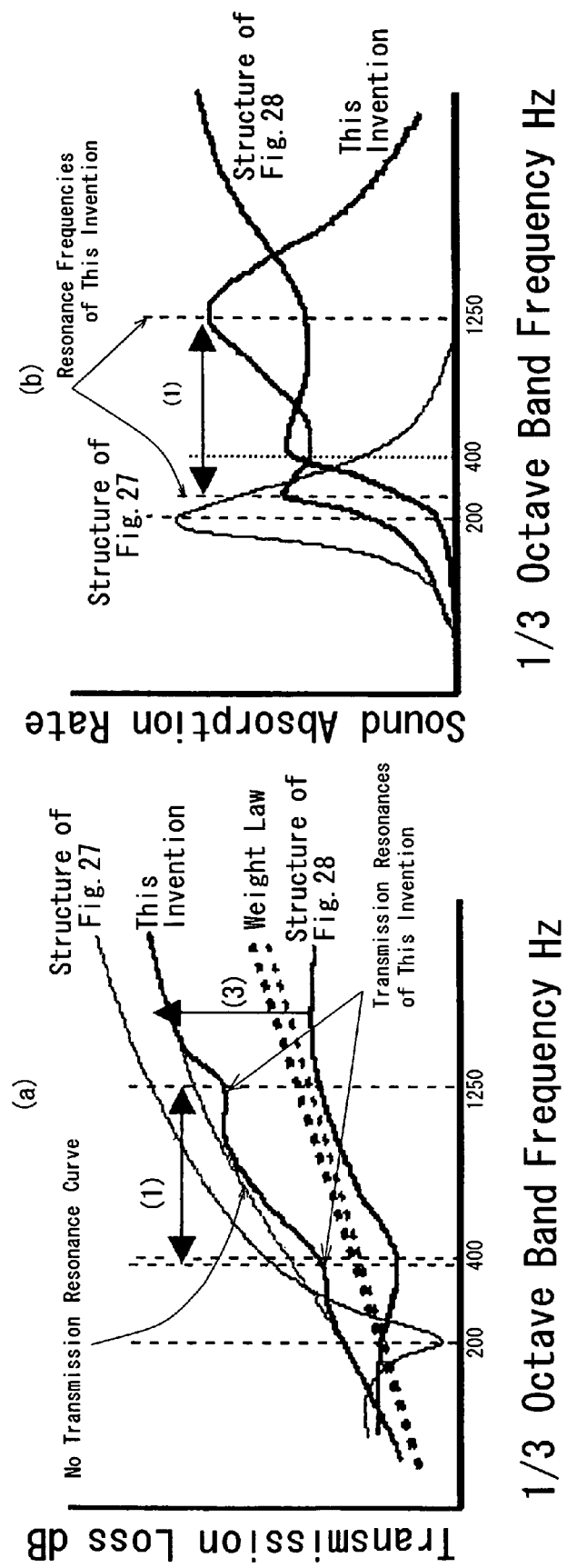
FIGS. 5(a) and 5(b) are graphs respectively showing frequency-transmission loss curves and frequency-sound absorption rate curves with regard to the dash silencer 1 of the first embodiment and the prior art structures of FIGS. 27 and 28.

The improvement in sound insulation property against direct sound incoming from the dash panel 10, that is, the enhancement of the transmission loss in the medium to high frequency domain having less transmission loss, is attained by forming the air-impermeable resonance layer 3 of a significantly less area-weight than that of the dash panel 10 as a surface layer and interposing the sound absorption layer 2 of the air-flow resistance between the dash panel 10 and the air-impermeable resonance layer 3. Unlike the prior art technique, the technique of this embodiment regulates the interface between the air-impermeable resonance layer 3 and the sound absorption layer 2 (that is, the adhesive force of the adhesive layer 4). The air-impermeable resonance layer 3 has the significantly reduced area-weight to be not greater than 200 g/m². This induces transmission resonances in a low frequency domain as well as in a high frequency domain (shown as (1) in FIGS. 5(a) and 5(b)). The two-layer structure of this embodiment effectively enhances the transmission loss (shown as (3) in FIG. 5(a)).

The structure of this embodiment ensures sufficient sound absorption even in an actual odd-shaped product having the sound absorption layer 2 of varying wall thickness. The structure of the embodiment effectively takes advantage of the membrane resonance of the sound absorption layer 2 and the air-impermeable resonance layer 3 to assure the high sound absorption rate in the medium to high frequency domain, even when the thickness of the sound absorption layer 2 is reduced for attachment of the resulting product in the restricted space. When the air-impermeable resonance layer 3 has an area-weight of 50 g/m², the relation between the thickness of the sound absorption layer 2 and the resonance frequency fr is given as Table 1:

TABLE 1

| | Thickness of Sound Absorption Layer (mm) | | | | |
|---|---|---|---|---|---|
| | 30 | 25 | 20 | 10 | 5 |
| Resonance Frequency (Hz) | 1531 | 1677 | 2166 | 2652 | 3750 |

Figure 6:
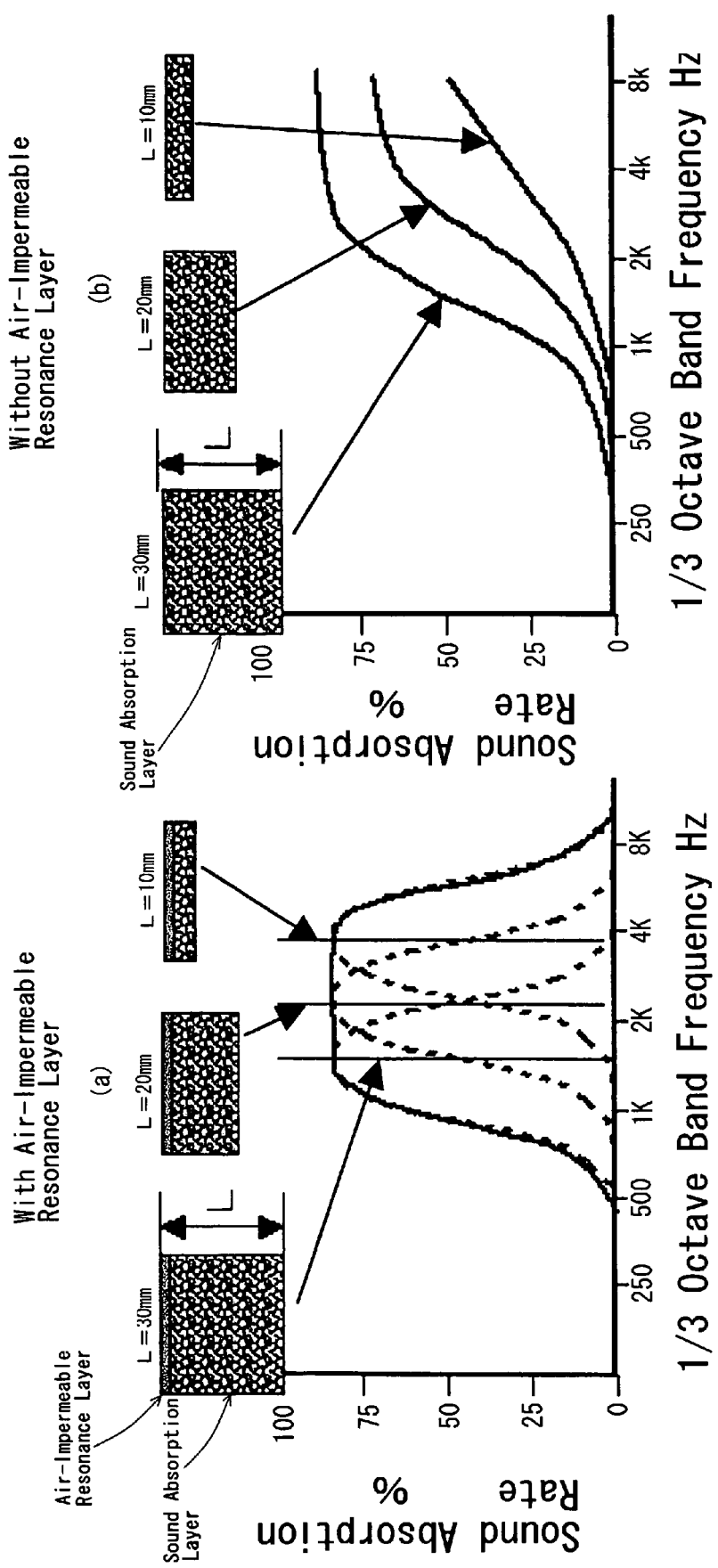
FIG. 6(a) is a graph showing frequency-sound absorption rate curves with regard to the dash silencer 1 of the first embodiment.
FIG. 6(b) is a graph showing frequency-sound absorption rate curves with regard to the dash silencer without an air-impermeable resonance layer.

Sound enters the vehicle interior in a diffusing manner. The air-impermeable resonance layer 3 is light in weight and has a low rigidity, so that resonance arises independently in a narrow area. The resonance frequency varies in a range of 1531 to 3750 Hz with a variation in thickness L of the sound absorption layer 2 in a range of 30 to 5 mm. As shown in FIGS. 6(a) and 6(b), the presence of the air-impermeable resonance layer 3 assures the sufficient high sound absorption rate in wide frequency domain, compared with the structure without any air-impermeable resonance layer.

A general spring-mass vibration model can be applied in this case. If we assume a mechanical spring including an air spring of the sound absorption layer 2 and the total mass of the sound absorption layer 2 and the air-impermeable resonance layer 3, a resonance frequency fr (Hz) is expressed by Equation 2 given below. In Equation 2, the spring constant k in the standard spring vibration equation is defined as k=ρ·C²/L, where ρ, C, m, and L respectively denote the air density (1.2 kg/m³), the sound velocity (340 m/s), the area-weight (g/m²) of the air-impermeable resonance layer 3, and the thickness (mm) of the sound absorption layer 2.

$$fr = \frac{1}{2\pi}\sqrt{\frac{\rho C^2}{mL}} \qquad \text{[Equation 2]}$$

fr: Resonance frequency

ρ: Air density 1.2 kg/m³

C: Sound velocity 340 m/s m: Area-weight of resonance layer

L: Thickness of sound absorption layer

Figure 7:
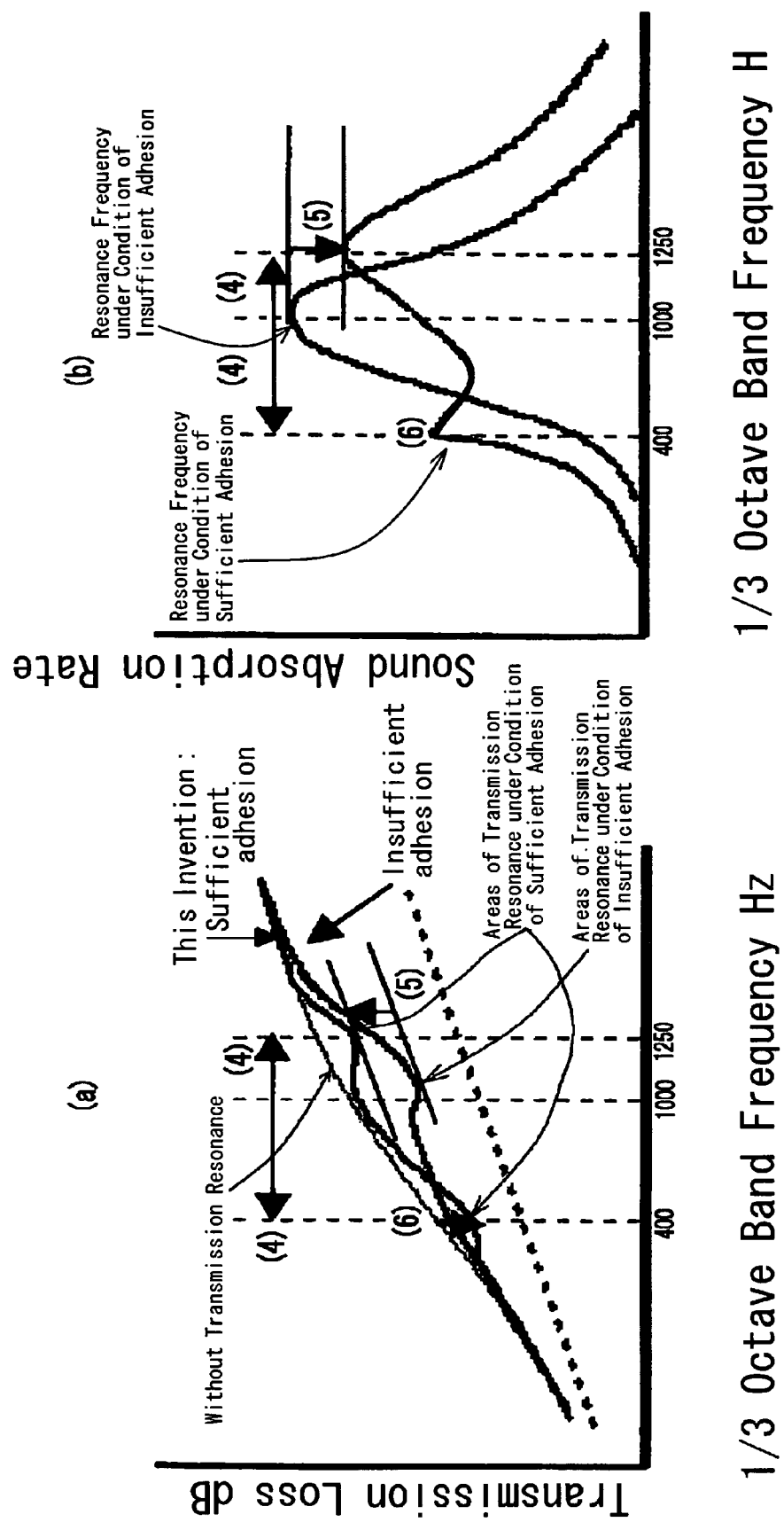
FIGS. 7(a) and 7(b) are graphs respectively showing frequency-transmission loss curves and frequency-sound absorption rate curves under sufficient adhesive conditions and under insufficient adhesive conditions in the dash silencer 1 of the first embodiment.

The structure of this embodiment effectively enhances the sound absorption rate in a frequency band of 250 to 500 Hz, which has generally poor sound absorbing power. Sufficient adhesion of the air-impermeable resonance layer 3 to the sound absorption layer 2 adds the mass of the sound absorption layer 2 to the spring-mass vibration system and shifts the resonance frequency of the air-impermeable resonance layer 3 to a higher frequency. The adhesion also causes a resonance frequency to appear at a lower frequency (shown as (4) in FIGS. 7(a) and 7(b)). The restricting force of the sound absorption layer 2 decreases the reduction of the transmission loss due to the resonance (shown as (5) in FIGS. 7(a) and 7(b)). The spring-mass including the air spring of the sound absorption layer 2 and the total mass of the sound absorption layer 2 and the air-impermeable resonance layer 3 induces resonance in a frequency band of 315 to 630 Hz and thus enhances the sound absorption rate in this frequency band (shown as (6) in FIGS. 7(a) and 7(b)).

The double-wall effect of the dash silencer 1 and the iron dash panel 10 attain the greater transmission loss than that expected by the weight law. The significant reduction in weight of the surface layer (the air-impermeable resonance layer 3) desirably shifts the frequency of transmission resonance, which worsens the double-wall effect, to the high frequency domain having the sufficiently high transmission loss. The extremely light-weight surface layer (the air-impermeable resonance layer 3) and regulation of the adhesive force between the air-impermeable resonance layer 3 and the sound absorption layer 2 to ensure the sufficient adhesive force and adhesion area decrease the reduction of the transmission loss due to the transmission resonance by the damping property of the sound absorption layer 2 (see FIG. 7(a). The extreme lightness of the air-impermeable resonance layer 3 and the regulated thickness of the sound absorption layer 2 to be not greater than 50 mm well control the resonance frequency in a frequency band of 315 to 4000 Hz, thus attaining the high sound absorption rate. The air-impermeable resonance layer 3 alone causes resonance in a medium frequency domain (640 to 1250 Hz) that belongs to higher frequency domain. Adhesion of the air-impermeable resonance layer 3 to the sound absorption layer 2 with the sufficient adhesive force and adhesion area, on the other hand, causes resonance in the spring-mass vibration system, which utilizes the partial mass of the sound absorption layer 2, in a lower frequency domain of 315 to 630 Hz. This effectively enhances the sound absorbing power (see FIG. 7(b)). The air-impermeable resonance layer 3 of the dash silencer 1 of the first embodiment has the significantly less area-weight than the surface layer of the prior art structure, but sufficiently insulates direct noise and sound incoming from the dash panel 10 (from the engine room) and effectively absorbs indirect noise and sound that incomes from another site (from the site other than the engine room) and is reflected in the vehicle interior.

In the structure of the first embodiment, due to the flexibility and thinness of the air-impermeable resonance layer 3 and so on, sound and noise in the vehicle interior interfere with this air-impermeable resonance layer 3, and the thin-membrane vibration of the sound absorption layer 2 and the air-impermeable resonance layer 3 occurs. This absorbs sound at the interface between the air-impermeable resonance layer 3 and the sound absorption layer 2 by resonance phenomenon. Utilization of the adhesive layer 4 interposed between the air-impermeable resonance layer 3 and the sound absorption layer 2 effectively control the frequency of sound absorbed at the interface. The structure of the first embodiment especially has the high sound absorbing power in a frequency band of 1000 to 1600 Hz, which desirably improves the clarity of conversation. The area-weight of the air-impermeable resonance layer 3 of 10 to 500 g/m² and the varying thickness of the sound absorption layer 2 in a range of 1 to 50 mm effectively enhance the sheet resonance-based sound absorbing power in the above frequency band, thus assuring the favorable stillness in the vehicle interior. Even when the thickness of the dash silencer 1 is reduced, the structure of the embodiment takes advantage of the resonance phenomenon of the sheets and thereby assures the high sound absorption rate. Compared with the prior art sound insulator, the structure of this embodiment significantly reduces the weight of the air-impermeable resonance layer.

Example 1 and Comparative Example

Figure 8:
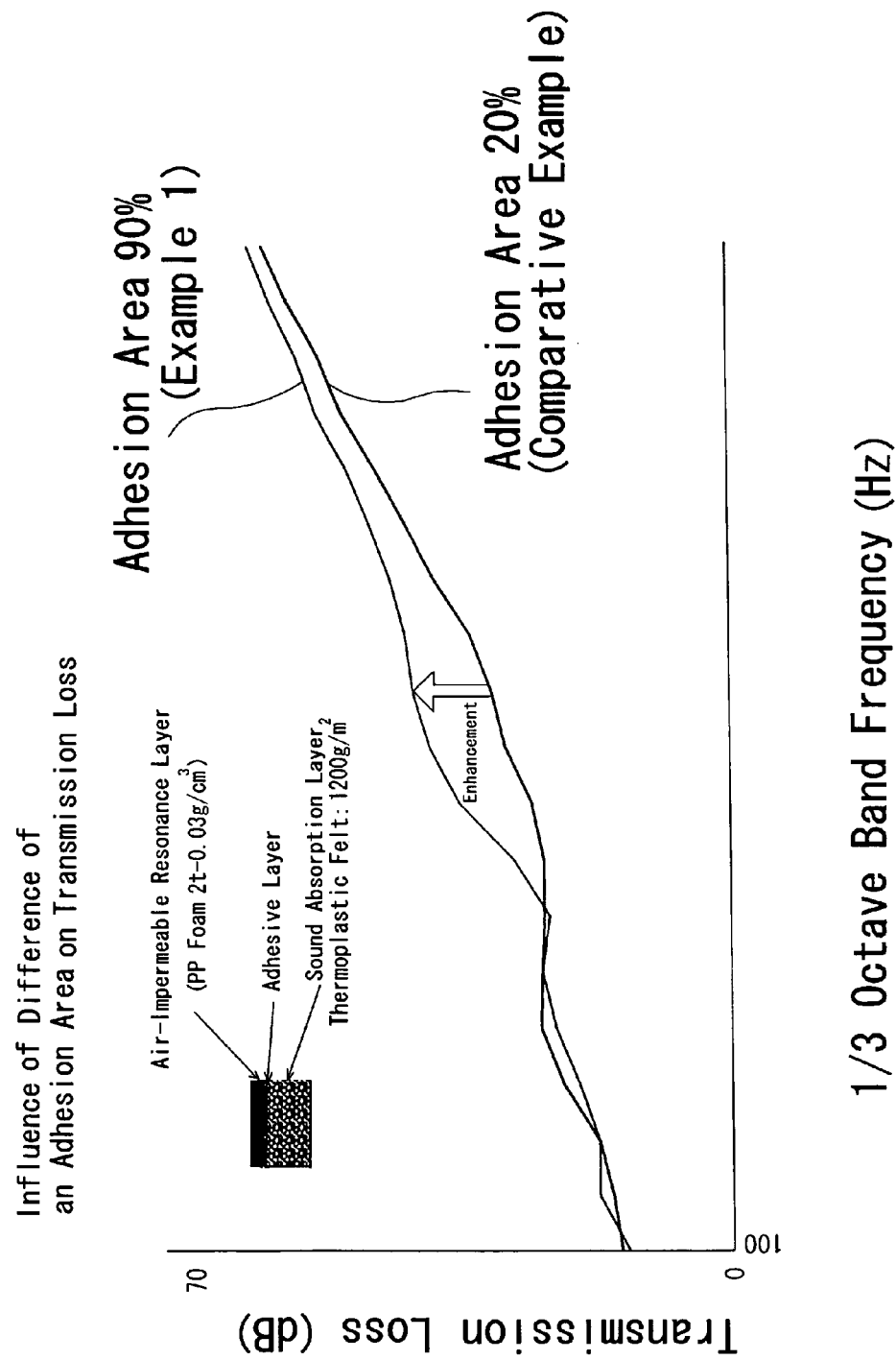
FIG. 8 is a graph showing ⅓ octave band frequency-transmission loss characteristic curves with regard to the dash silencer 1.
Figure 9:
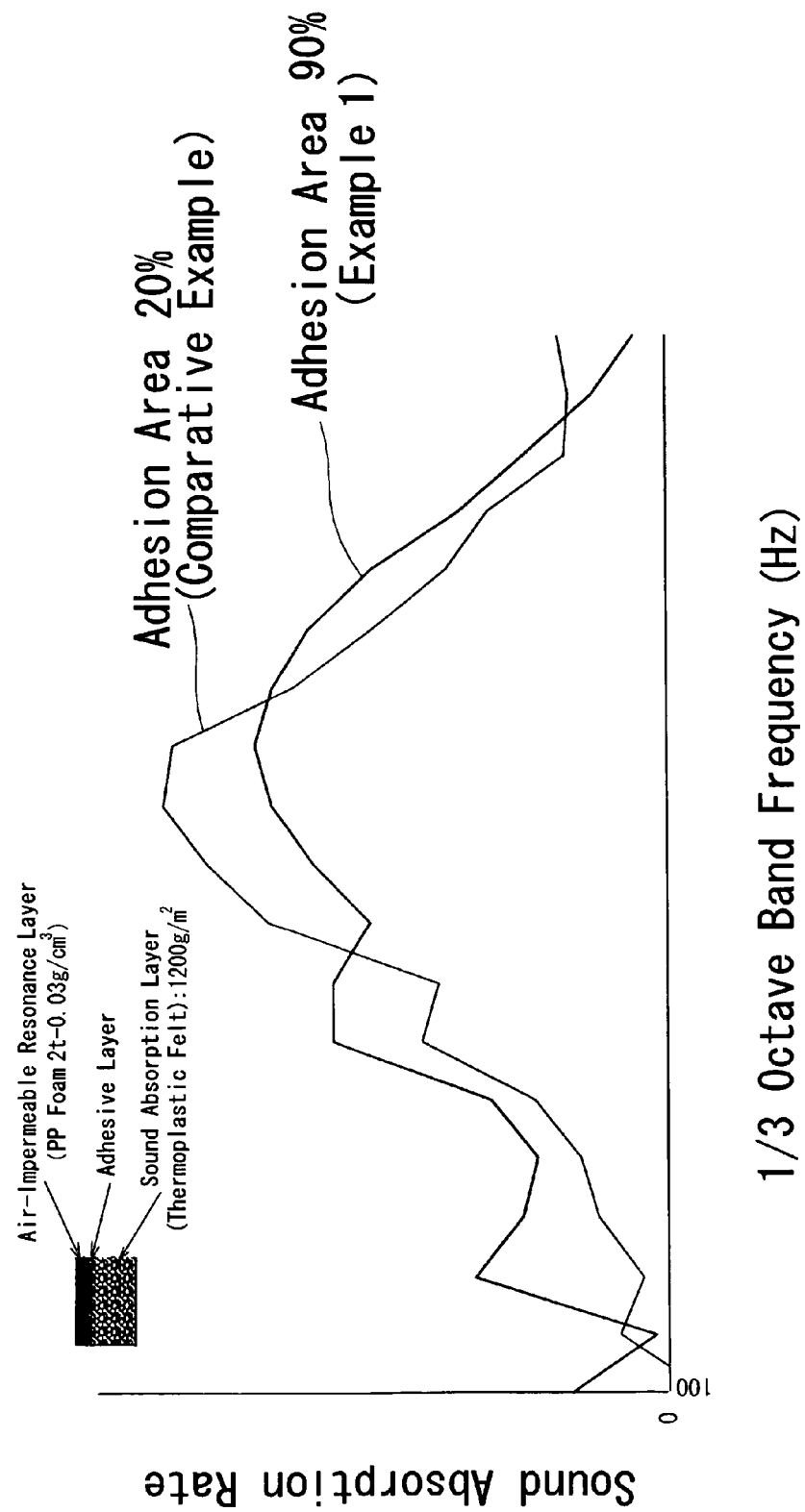
FIG. 9 is a graph showing ⅓ octave band frequency-sound absorption rate characteristic curves with regard to the dash silencer 1.

The graphs of FIGS. 8 and 9 show comparison of the transmission loss and the sound absorption rate between Example 1 and Comparative Example. Example 1 and Comparative Example had the same structure, except the adhesion area of the adhesive layer 4 was 90% in Example 1 and was 20% in Comparative Example. The total thickness of the dash silencer 1 was 22 mm; the respective thicknesses of the sound absorption layer 2, the air-impermeable resonance layer 3, and the adhesive layer 4 were 20 mm, 2 mm, and 50 μm. The air-impermeable resonance layer 3 of the dash silencer 1 was made of polypropylene foam (PPF: 30-fold expansion) and had a specific gravity of 0.031 g/cm³, a thickness of 2 mm and an area-weight of 62 g/m². The sound absorption layer 2 was made of thermoplastic felt (conventional felt of synthetic polyester fibers and crude cotton) and had a specific gravity of 0.06 g/cm³, a thickness of 20 mm and an area-weight of 1200 g/m². The adhesive area of the adhesive layer was 90%. The dash silencer 1 of Example 1 was manufactured by applying an aqueous EVA adhesive onto the air-impermeable resonance layer 3 of polypropylene foam (the 30-fold expansion and the thickness of 2 mm) at a density of 50 g/m², and compressing the adhesive-applied air-impermeable resonance layer 3 with the sound absorption layer 2 of thermoplastic felt or needle-punched felt under a pressure of 1 kg/cm² for 60 seconds. When the adhesive is not readily dried, the compression time may be reduced to approximately 30 seconds under application of heat. The adhesion strength is 2 to 8 N/25 mm and the adhesion area is approximately 90% of the whole interface. The observed peeling state was surface destruction of the thermoplastic felt of the sound absorption layer 2. Needle-punched felt has the higher resistance to surface destruction and gives the adhesion strength of 5 to 10 N/25 mm.

As shown in the graph of FIG. 8, the transmission loss in a frequency domain of not lower than 400 Hz is higher in Example 1 having the adhesion area of 90% than in Comparative Example having the adhesion area of 20%. The structure of Example 1 thus more effectively reduces noise from the vehicle exterior into the vehicle interior. As mentioned above, the needle-punched felt has the higher resistance to surface destruction and gives the adhesion strength of 5 to 10 N/25 mm. Selection of the needle-punched felt for the sound absorption layer 2 thus further enhances the transmission loss by 1 to 3 dB in this frequency domain of not lower than 400 Hz, although not specifically shown in the graph.

As shown in the graph of FIG. 9, the sound absorption rate in Example 1 having the adhesion area of 90% has a slight decrease in a frequency domain of 630 to 1600 Hz, compared with that of Comparative Example having the adhesive area of 20%. This slight decrease is ascribed to restriction of the air-impermeable resonance layer by the adhesive force and the adhesion area and the resulting vibration isolation and damping. The sound absorption rate is, however, still not lower than 0.6 (60%) and is sufficient for absorption of noise in the vehicle interior. Comparative Example has the higher sound absorption owing to the air-impermeable resonance layer. The structure of Example 1 having the adhesive area of 90% has the higher sound absorption rate in frequency bands other than the domain of 630 to 1600 Hz than the structure of Comparative Example having the adhesive area of 20%, owing to the resonance phenomenon of the air-impermeable resonance layer and the sound absorption layer related to the adhesive force and the adhesive area. Example 1 thus more effectively reduces noise in these other frequency bands in the vehicle interior, compared with Comparative Example. In addition, in the frequency domain of about 400 to 500 Hz, a sound absorption rate of 0.7 (70%) is attained due to the resonance frequency related to both of the air-impermeable resonance layer and the sound absorption layer. This effectively reduces noise in a medium frequency domain in the vehicle interior.

Second Embodiment

FIG. 10(a) shows a dash silencer 201 of a second embodiment. The dash silencer 201 of the second embodiment has a similar structure to that of the dash silencer 1 of the first embodiment, so the explanation about the first embodiment can be applied hereto. The primary difference is that a sound absorption layer 202 of the dash silencer 201 has a high-density sound absorption layer 202a and a low-density sound absorption layer 202b having different densities. The high-density and low-density sound absorption layers 202a and 202b are arranged on the side of the dash panel 10, whereas an air-impermeable resonance layer 203 is arranged on the side of the vehicle interior. The low-density sound absorption layer 202b is bonded to the dash panel 10.

One face of the high-density sound absorption layer 202a is bonded to the air-impermeable resonance layer 203 via an adhesive layer 204. The high-density sound absorption layer 202a has a density in a range of 0.05 to 0.20 g/cm³ and a thickness in a range of 2 to 30 mm. The low-density sound absorption layer 202b has a density in a range of 0.01 to 0.10 g/cm³ and a thickness in a range of 2 to 30 mm, and is bonded to the other face of the high-density sound absorption layer 202a, which is opposite to the air-impermeable resonance layer 203, via an adhesive layer 202c. The high-density sound absorption layer 202a has an initial compression repulsive force in a range of 30 to 400 N, while the low-density sound absorption layer 202b has an initial compression repulsive force in a range of 0.5 to 200 N. The initial compression repulsive force of the high-density sound absorption layer 202a is at least 1.2 to 40 times the initial compression repulsive force of the low-density sound absorption layer 202b. The thickness of the high-density sound absorption layer 202a occupies 20 to 80% of the thickness of the sound absorption layer 202. More preferably, the initial compression repulsive forces of the high-density sound absorption layer 202a and the low-density sound absorption layer 202b are respectively in a range of 200 to 300 N and in a range of 50 to 100N, and the initial compression repulsive force of the high-density sound absorption layer 202a is at least 1.5 to 5 times the initial compression repulsive force of the low-density sound absorption layer 202b, and the thickness of the high-density sound absorption layer 202a occupies 40 to 60% of the thickness of the sound absorption layer 202.

The high-density sound absorption layer 202a and the low-density sound absorption layer 202b of the sound absorption layer 202 may form a multi-layer structure of two different materials or may otherwise form a mono-layer structure of an identical material having a density gradient from a higher density to a lower density.

The sound absorption layer 202, the air-impermeable resonance layer 203, and the adhesive layer 204 are made of the same materials as those of the first embodiment.

Figure 11:
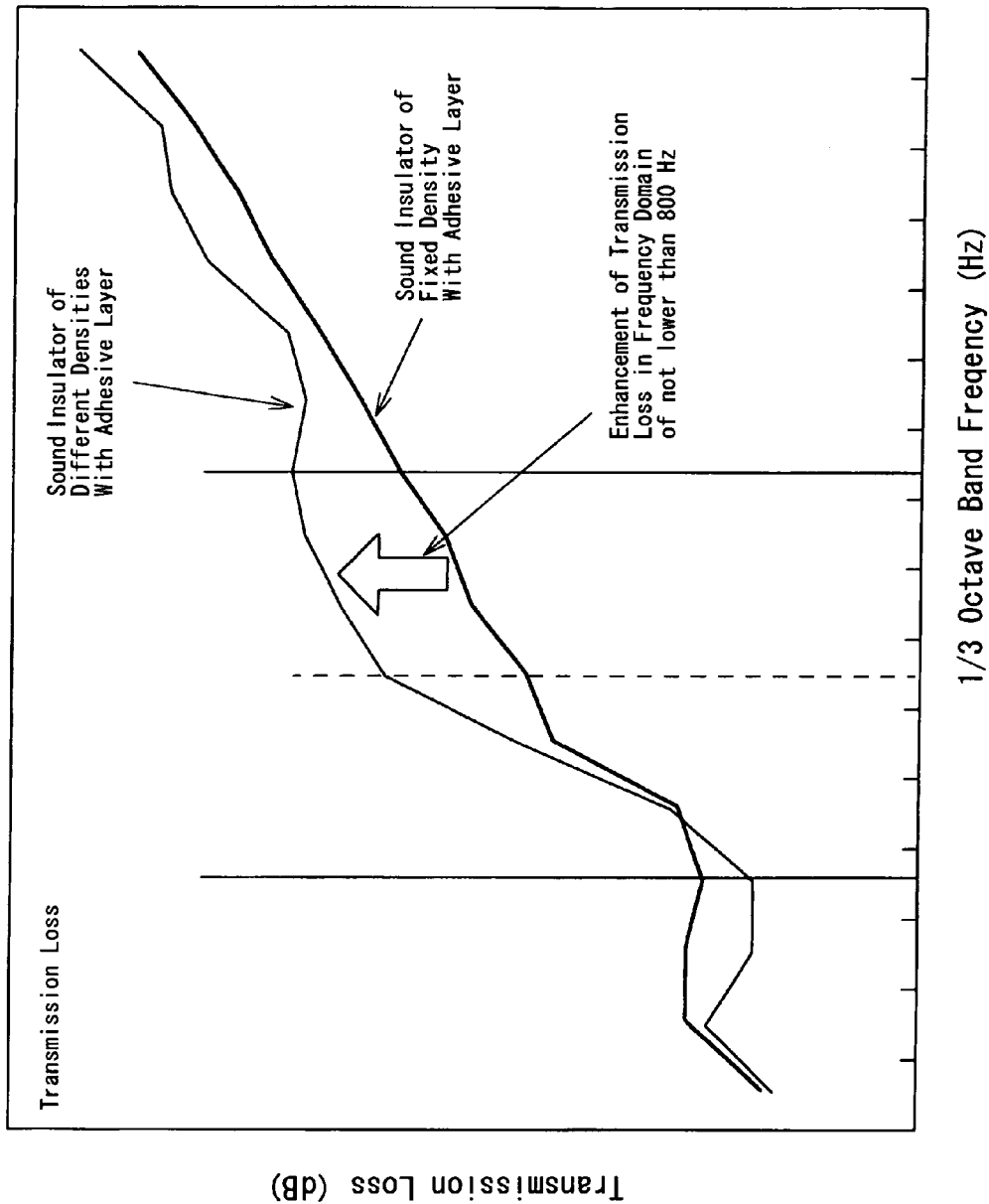
FIG. 11 is a graph showing frequency-transmission loss curves with regard to a varying-density, two-layer sound absorption layer and a mono-layer sound absorption layer on a fixed density in the dash silencer 201 of the second embodiment.

The graph of FIG. 11 shows frequency-transmission loss curves with regard to the sound absorption layer 202 of the varying-density, two-layer structure including the high-density sound absorption layer 202a and the low-density sound absorption layer 202b and with regard to a sound absorption layer of a fixed density in the dash silencer 201 of the second embodiment shown in FIG. 10(a). The varying-density, two-layer structure of the sound absorption layer 202 including the high-density sound absorption layer 202a and the low-density sound absorption layer 202b significantly enhances the transmission loss in a medium (640 to 1250 Hz) and higher frequency domain.

Figure 12:
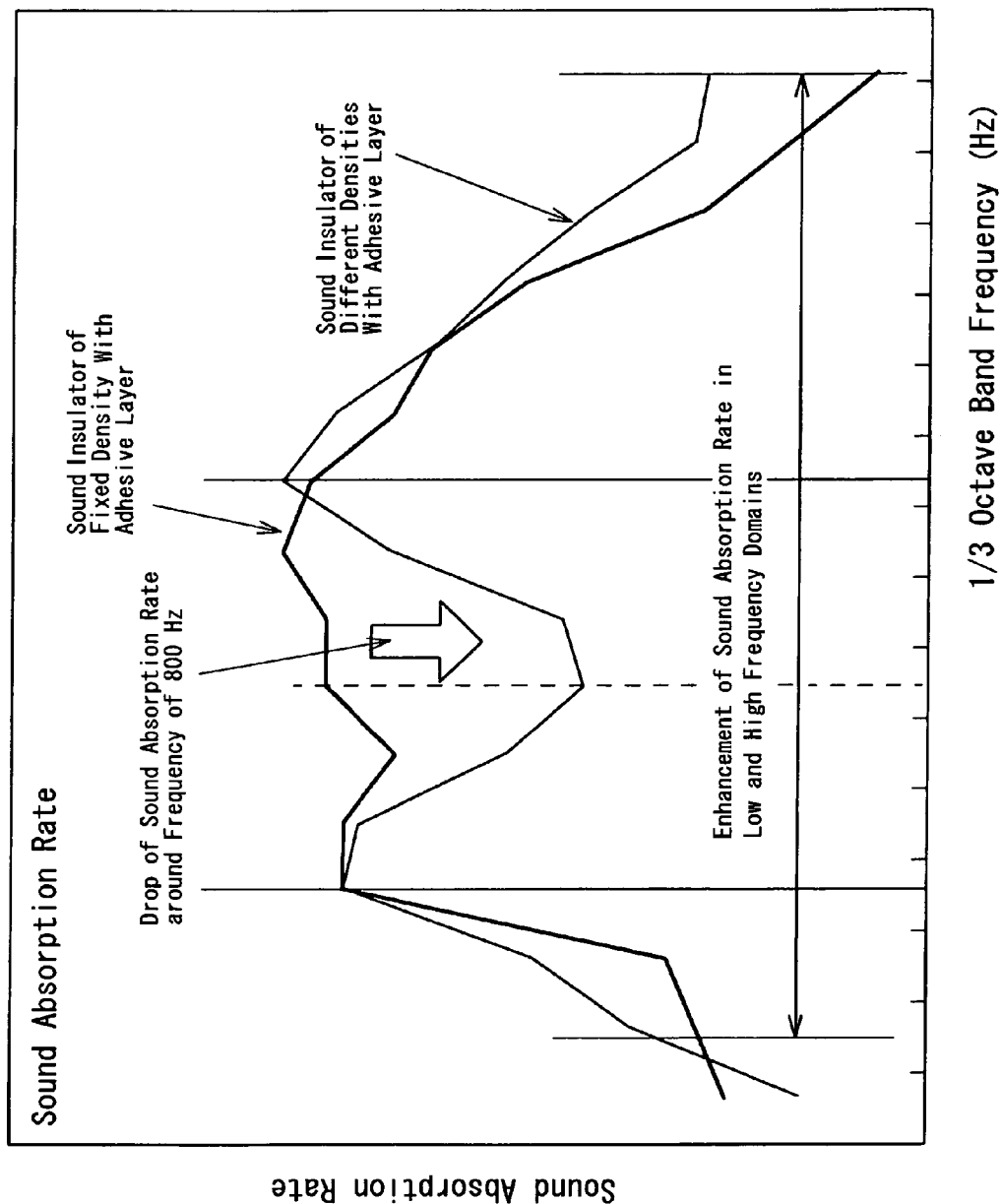
FIG. 12 is a graph showing frequency-sound absorption rate curves with regard to a varying-density, two-layer sound absorption layer and a mono-layer sound absorption layer of a fixed density in the dash silencer 201 of the second embodiment.

The graph of FIG. 12 shows frequency-sound absorption rate curves with regard to the sound absorption layer 202 of the varying-density two-layer structure including the high-density sound absorption layer 202a and the low-density sound absorption layer 202b in the dash silencer 201 of the second embodiment shown in FIG. 10(a) and with regard to the sound absorption layer 2 of a fixed density in the dash silencer 1 of the first embodiment shown in FIG. 3. The dash silencer 1 of the first embodiment having the sound absorption layer 2 of the fixed density has a significantly increase in sound absorption rate only in the medium frequency domain of 640 to 1250 Hz. The dash silencer 201 of the second embodiment having the sound absorption layer 202 of the different densities, on the other hand, has an increase in sound absorption rate not only in the medium frequency domain of 640 to 1250 Hz but in a wide frequency domain of 315 to 4000 Hz. The dash silencer 201 of the second embodiment having the sound absorption layer 202 of the different densities has the lower sound absorption rate in a frequency domain of 400 to 1600 Hz than the dash silencer 1 of the first embodiment having the sound absorption layer 2 of the fixed density. The structure of the second embodiment has apparent peaks corresponding to resonance frequencies. This is ascribed to the rigidity of the air-impermeable resonance layer 203 and the high-density sound absorption layer 202a via the adhesive layer 204. The resonance frequency is shifted to the higher frequency with an increase in rigidity. In the structure of the second embodiment, a peak corresponding to a lower resonance frequency also appears in a low frequency domain of 125 to 500 Hz. This is not affected by a variation in rigidity with the varying density of the sound absorption layer 202, but is ascribed to the functions according to a spring of the sound absorption layer 202 and the total mass of the air-impermeable resonance layer 203 and the sound absorption layer 202 in the spring-mass vibration system.

Figure 13:
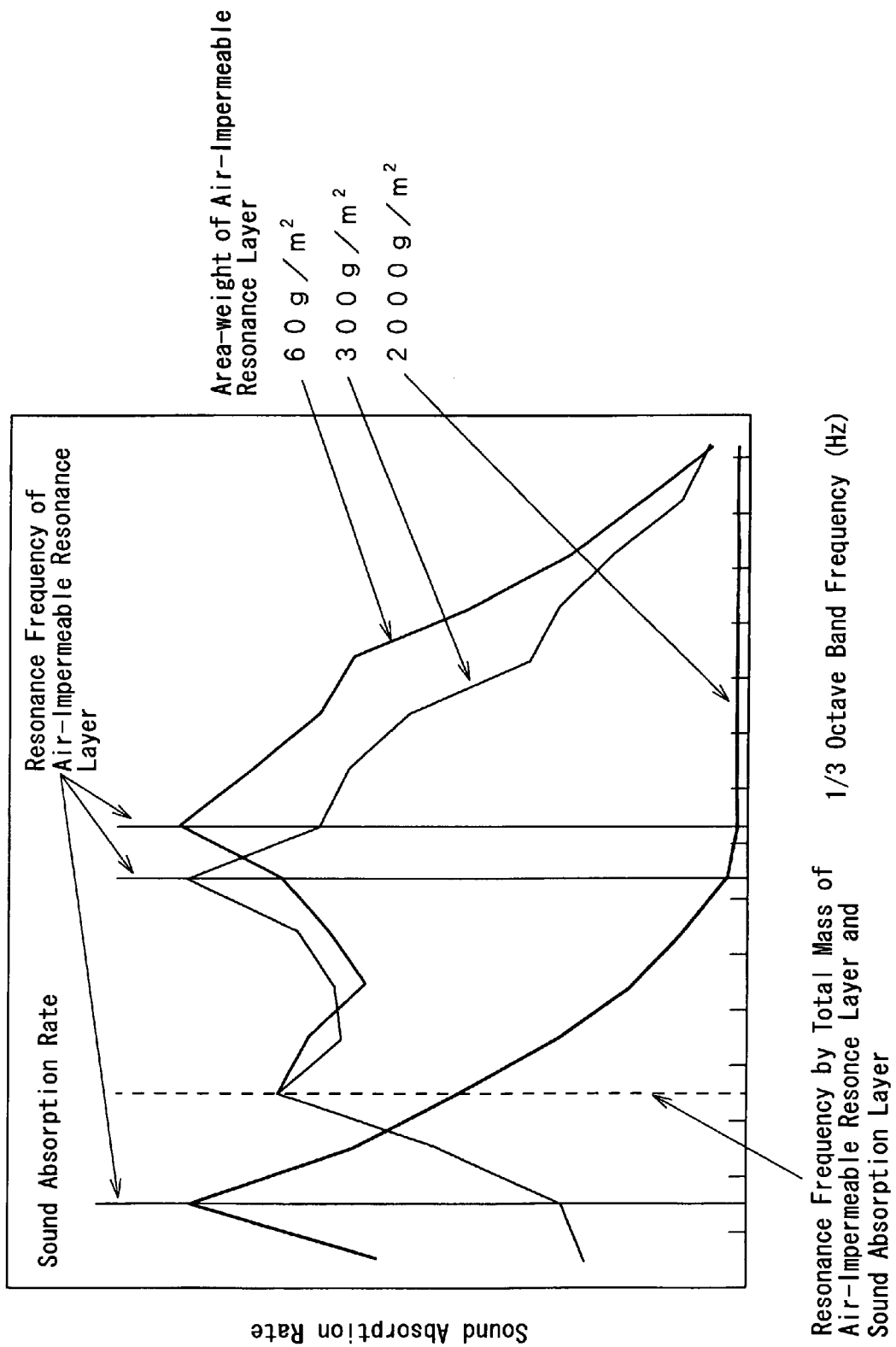
FIG. 13 is a graph showing frequency-sound absorption rate curves when there is an adhesive layer and the sound absorption layer has a density variety.

The graph of FIG. 13 shows frequency-sound absorption rate curves in the dash silencer 201 of the second embodiment shown in FIG. 10(a) having the sound absorption layer 202 of the varying-density, two-layer structure and the adhesive layer 204 with regard to varying masses of the air-impermeable resonance layer 203. The graph of FIG. 13 is based on the data in the absence of the second sound absorption layer 306. In the graph of FIG. 13, the resonance frequency of the sound absorption rate appearing as a peak in the higher frequency domain varies with a variation in mass of the air-impermeable resonance layer 203. This phenomenon is observed, regardless of the presence or the absence of a second sound absorption layer 306. The graph of FIG. 13 is thus applicable to the cases where the second sound absorption layer 306 exists as well as to the cases where the second sound absorption layer 306 does not exist. The resonance frequency in the higher frequency domain varies according to the mass of the air-impermeable resonance layer 203. There is a peak at a resonance frequency of 1250 Hz when the mass of the air-impermeable resonance layer 203 is 60 g/m$^2$. This corresponds to a thickness of 2 to 3 mm in the case of the foam and to a thickness of 20 to 100 μm in the case of the film. The resonance frequency is shifted to 1000 Hz when the mass of the air-impermeable resonance layer 203 is 300 g/m$^2$, and is shifted to 315 Hz when the mass of the air-impermeable resonance layer 203 is 2000 g/m$^2$. The significant increase in mass of the air-impermeable resonance layer 203 undesirably shifts the resonance frequency to the lower frequency domain and causes insufficient sound absorption in a desired frequency domain.

In the ultra-light dash silencer 201 of the second embodiment shown in FIG. 10(a) including the varying-density sound absorption layer 202 and the air-impermeable resonance layer 203 via the adhesive layer 204, there is a vibration, due to the air spring of the sound absorption layer 202 and the total mass of the air-impermeable resonance layer 203 and the sound absorption layer 202. There is also another vibration, due to the spring of the air spring of the sound absorption layer 202 and the rigidity of the air-impermeable resonance layer 203, and the mass of the air-impermeable resonance layer 203. The vibration due to the air spring of the sound absorption layer 202 and the total mass of the air-impermeable resonance layer 203 and the sound absorption layer 202 gives a peak of sound absorption rate in the low frequency domain of 125 to 500 Hz in the graph of FIG. 15 without the second sound absorption layer 306 (discussed later). The vibration due to the spring of the air spring of the sound absorption layer 202 and the rigidity of the air-impermeable resonance layer 203, and the mass of the air-impermeable resonance layer 203 gives another peak of sound absorption rate in a high frequency domain of 1600 to 6400 Hz in the graph of FIG. 15 without the second sound absorption layer 306. The peak of sound absorption rate in the high frequency domain is affected by the coincidence effect relating to the rigidity of the air-impermeable resonance layer 203 bonded to the high-density sound absorption layer 202a via the adhesive layer 204.

Example 2

The structure of Example 2 was similar to the structure of Example 1, except the varying-density of the sound absorption layer. The high-density sound absorption layer 202a was made of thermoplastic felt (of reused synthetic fibers and PE fibers with PET used as binding fibers) and had a density of 0.100 g/cm$^3$, a thickness of 10 mm, an area-weight of 1000 g/cm$^2$, and an initial compression repulsive force of 200 N.

The low density sound absorption layer 202b was made of cotton fiber felt and had a density of 0.04 g/cm³, a thickness of 10 mm, an area-weight of 400 g/m², and an initial compression repulsive force of 50 N. The adhesive force of the adhesive layer 204 was 5 N/25 mm. The high-density sound absorption layer 202a and the low-density sound absorption layer 202b may be made of PET felt and joined together by needle punching.

Third Embodiment

A dash silencer 301 of a third embodiment shown in FIG. 10(b) has a vehicle interior-side adhesive layer 305 and a second sound absorption layer 306, in addition to the structure of the dash silencer 201 of the second embodiment shown in FIG. 10(a). In the dash silencer 301 of the third embodiment, an air-impermeable resonance layer 303 is bonded to the light-weight second sound absorption layer 306 via the vehicle interior-side adhesive layer 305 having an arbitrary thickness, for example, a thickness of 20 to 100 µm. The second sound absorption layer 306 has a density in a range of 0.01 to 0.1 g/cm³ or more preferably in a range of 0.02 to 0.04 g/cm³ and a thickness in a range of 1 to 10 mm or more preferably in a range of 4 to 6 mm.

Figure 14:
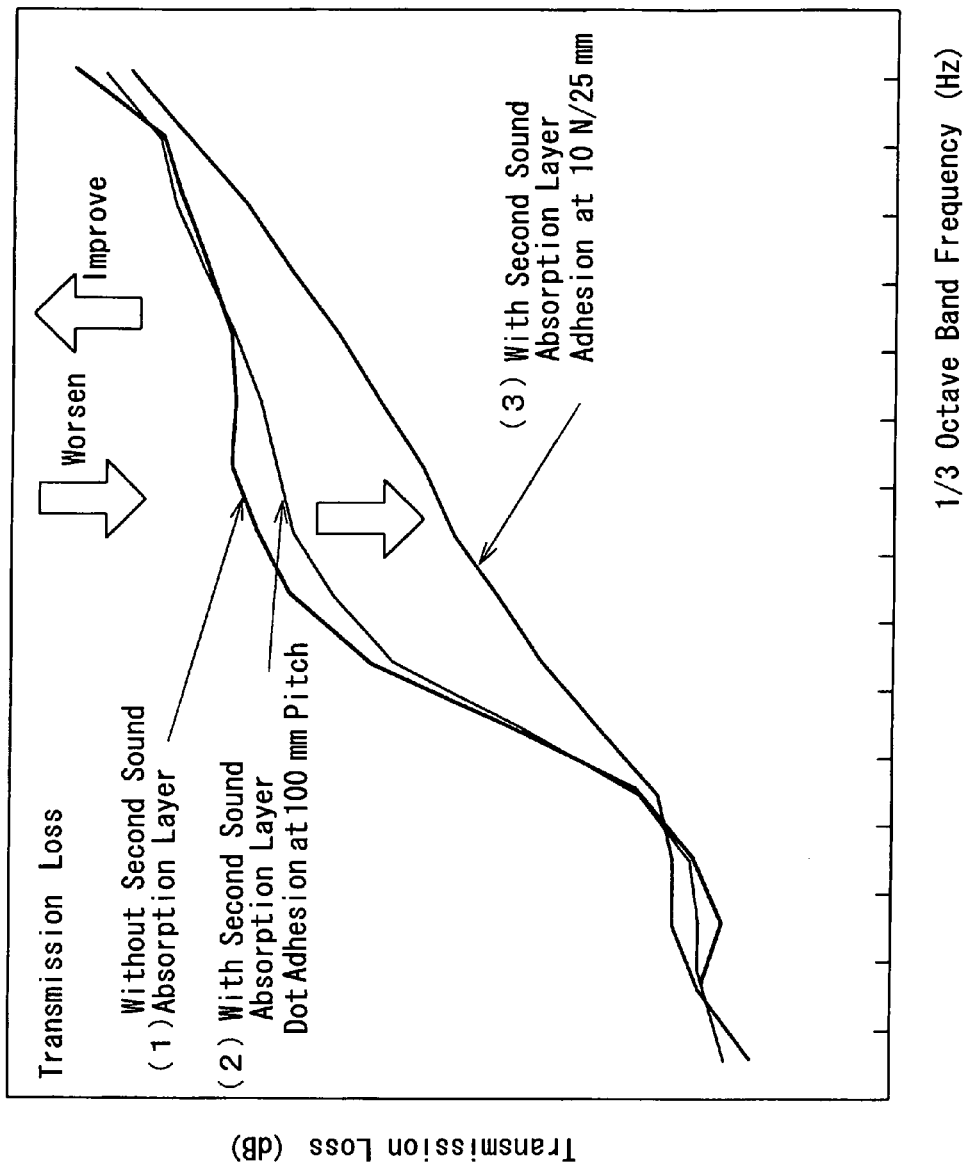
FIG. 14 is a graph showing frequency-transmission loss curves in the presence and in the absence of the second sound absorption layer under various adhesive conditions.
Figure 15:
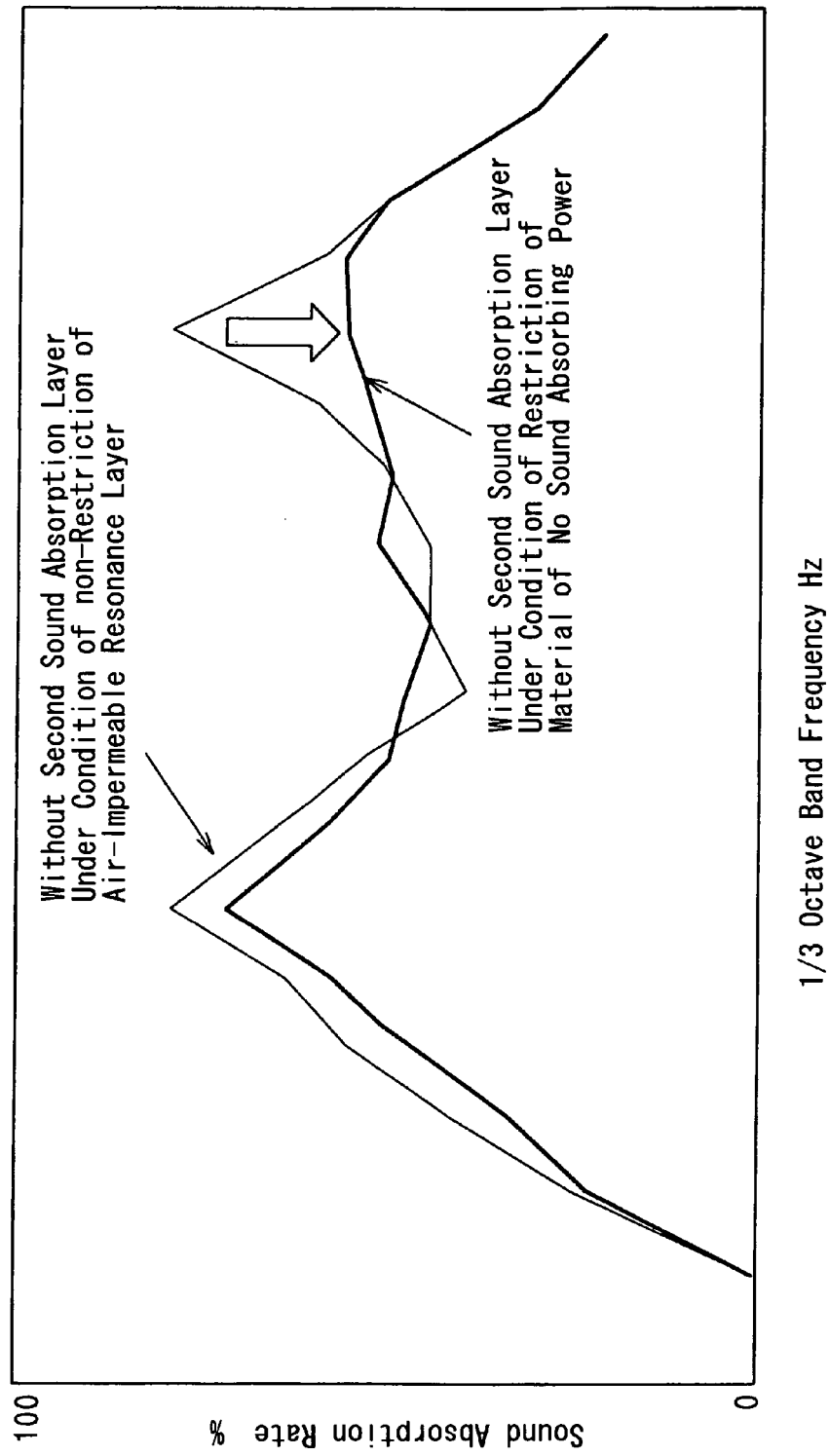
FIG. 15 is a graph showing the frequency-sound absorption rate curves in the absence of the second sound absorption layer and under restriction or non-restriction of the air-impermeable resonance layer with a material of no sound absorbing power in the dash silencer 301 of the third embodiment.
Figure 16:
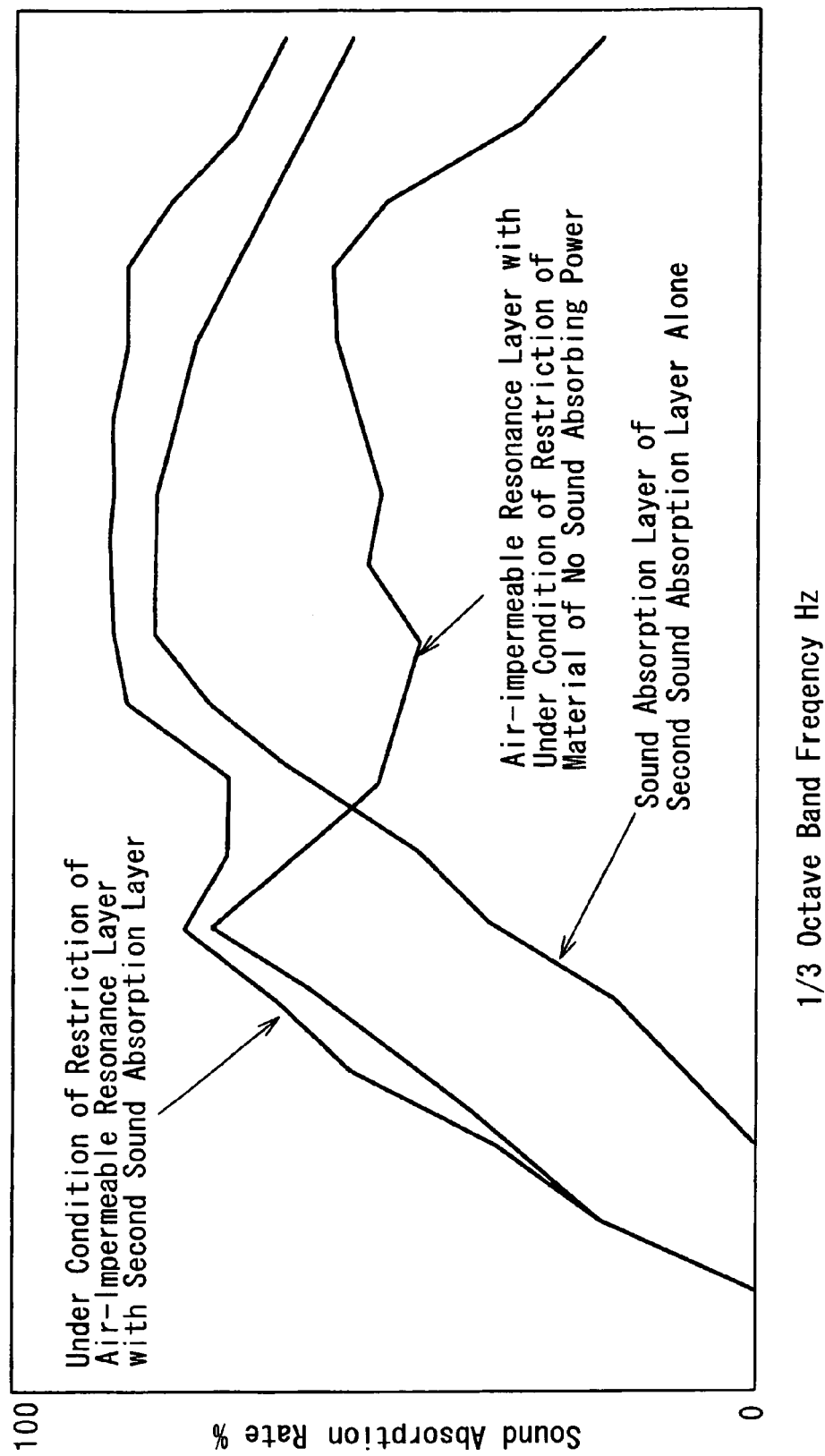
FIG. 16 is a graph showing the frequency-sound absorption rate curves under restriction of the air-impermeable resonance layer with the second sound absorption layer and with a material of no sound absorbing power in the dash silencer 301 of the third embodiment.

In the dash silencer 301 of the third embodiment, the second sound absorption layer 306 is added to improve the sound absorption in the high frequency domain in the vehicle interior. The graphs of FIG. 14 to 16 shows the effects of the second sound absorption layer 306 and the adhesive conditions onto the air-impermeable resonance layer 303. The graph of FIG. 14 shows the effects of the second sound absorption layer 306 onto transmission loss. The graphs of FIGS. 15 and 16 show the effects of the second sound absorption layer 306 onto the sound absorption rate. As shown in the graph of FIG. 14, the structure (1) without the second sound absorption layer 306 and the structure (2) with the second sound absorption layer 306 under the condition of dot adhesion at a pitch of 100 mm have the better settings of transmission loss than the structure (3) with the second sound absorption layer 306 under the condition of adhesion at 10 N/25 mm. The structure (1) has a little higher transmission loss than the structure (2). The graph of FIG. 15 shows the sound absorption rate of the structure without the second sound absorption layer 306. The air-impermeable resonance layer 303 vibrates sympathetically under the condition of a less restriction. Peaks of sound absorption rate corresponding to resonance frequencies appear in the high frequency domain of 1600 to 6400 Hz and the low frequency domain of 125 to 500 Hz. Restriction of the air-impermeable resonance layer 303 with a material of no sound absorbing power lowers the sound absorption rate in the high frequency domain of 1600 to 6400 Hz as shown by an open arrow. The second sound absorption layer 306 formed on the air-impermeable resonance layer 303 restricts the air-impermeable resonance layer 303 which is the surface layer. As shown in the graph of FIG. 16, while the presence of the second sound absorption layer 306 lowers the peak of sound absorption rate in the high frequency domain, the additional sound absorbing power of the second sound absorption layer 306 effectively heightens the resulting sound absorption rate in a medium (640 to 1250 Hz) to high (1600 to 6400 Hz) frequency domain, compared with the structure under restriction of the air-impermeable resonance layer 303 with a material of no sound absorbing power.

In the ultra-light dash silencer 301 of the third embodiment shown in FIG. 10(b) including the vehicle interior-side adhesive layer 305 and the second sound absorption layer 306, there is a vibration, due to the air spring of a first sound absorption layer 302 and the total mass of the second sound absorption layer 306, the air-impermeable resonance layer 303, and the first sound absorption layer 302. This gives a peak of sound absorption rate in the low frequency domain of 125 to 500 Hz in the graph of FIG. 16 with the second sound absorption layer 306. There is also another vibration, due to the air spring of the first sound absorption layer 302 and the mass of the second sound absorption layer 306 and the air-impermeable resonance layer 303. This gives another peak of sound absorption rate in the high frequency domain of 1600 to 6400 Hz in the graph of FIG. 16 with the second sound absorption layer 306 restricting the air-impermeable resonance layer 303. This model is also affected by the coincidence effects.

The varying density of the sound absorption layer 302 affects the coincidence effects of a high-density sound absorption layer 302a and thus affects a peak of sound absorption rate in the high frequency domain.

Example 3

The structure of Example 3 had the second sound absorption layer 306 bonded to the air-impermeable resonance layer 303 by dot adhesion at a pitch of 100 mm, in addition to the structure of Example 2. The second sound absorption layer 306 was made of thermoplastic felt (of reused synthetic fibers and PE fibers with PET used as binding fibers) and had a density of 0.04 g/cm³, a thickness of 5 mm, an area-weight of 200 g/cm², and an initial compression repulsive force of 50 N.

Fourth Embodiment

Figure 17:
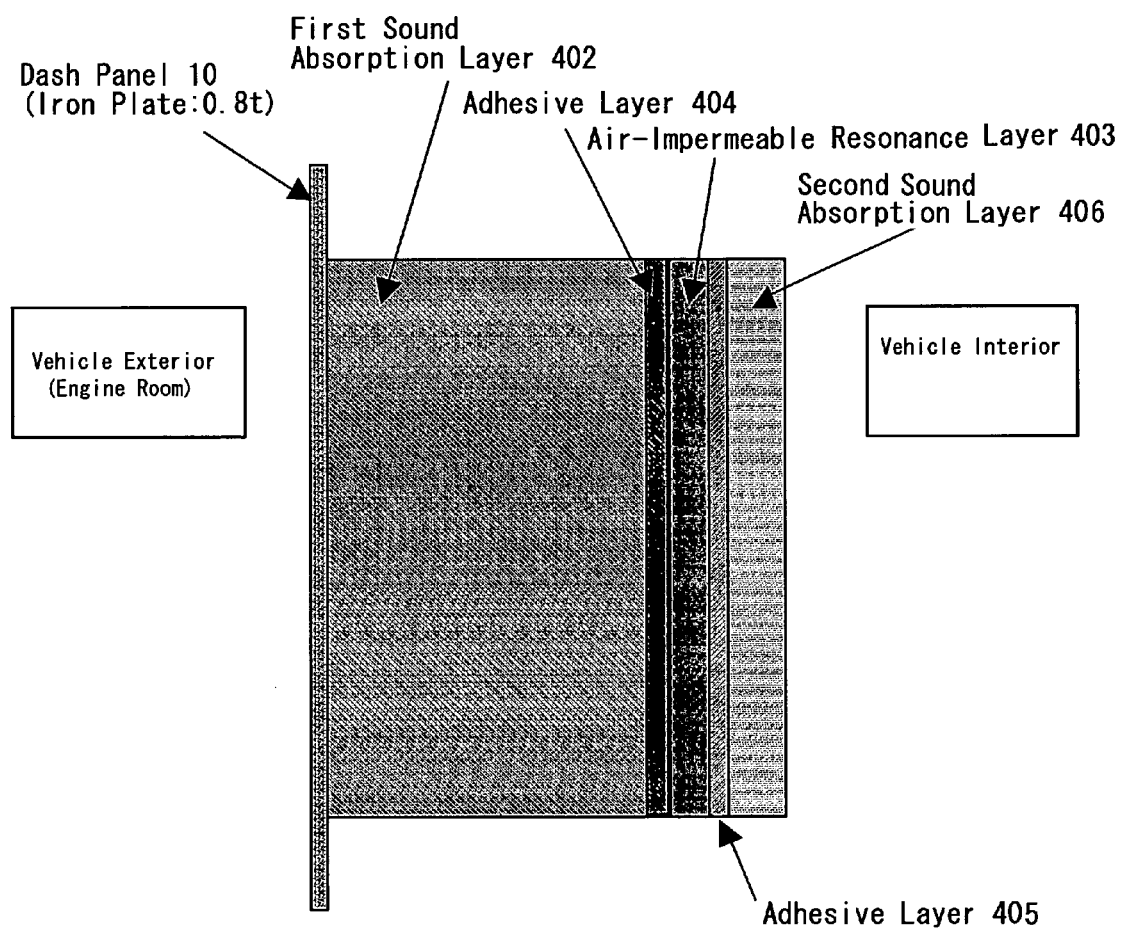
FIG. 17 shows the basic structure of a dash silencer 401 (having a mono-layer sound absorption layer) in a fourth embodiment of the invention.

A dash silencer 401 of a fourth embodiment is discussed below with reference to FIG. 17. The dash silencer 401 of the fourth embodiment has a mono-layer first sound absorption layer 402 of a fixed density (or a multi-layer first sound absorption layer of a fixed density), in place of the first sound absorption layer 302 in the dash silencer 301 of the third embodiment, and otherwise has the similar structure to that of the dash silencer 301 of the third embodiment. Parts in the force embodiment were numbered, adding 400 to the number of the corresponding part in the third embodiment. The similar constituents are not specifically described here. In the dash silencer 401 of the fourth embodiment shown in FIG. 17, the vehicle interior, a second sound absorption layer 406, an adhesive layer 405, an air-impermeable resonance layer 403, another adhesive layer 404, the first sound absorption layer 402, and the vehicle exterior (for example, an engine room) are arranged in this order. The first sound absorption layer 402 is fixed to the dash panel 10 as the vehicle body, and the second sound absorption layer 406 faces to the vehicle interior. A modified structure of the dash silencer 401 without the adhesive layer 404 gives a spring-mass single vibration model including the air-impermeable resonance layer 403 as the mass and the first sound absorption layer 402 as the spring. Namely the simple membrane resonance of the air-impermeable resonance layer 403 arises in the medium frequency domain of 640 to 1250 Hz. In the structure of the dash silencer 401 with the adhesive layer 404, on the other hand, resonance arises in the low frequency domain of 125 to 500 Hz, simultaneously with the membrane resonance of the air-impermeable resonance layer 403 in the medium frequency domain of 640 to 1250 Hz. This shows a spring-mass vibration system including the spring of the first sound absorption layer 402 and the mass of the air-impermeable resonance layer 403 and the first sound absorption layer 402.

Figure 18:
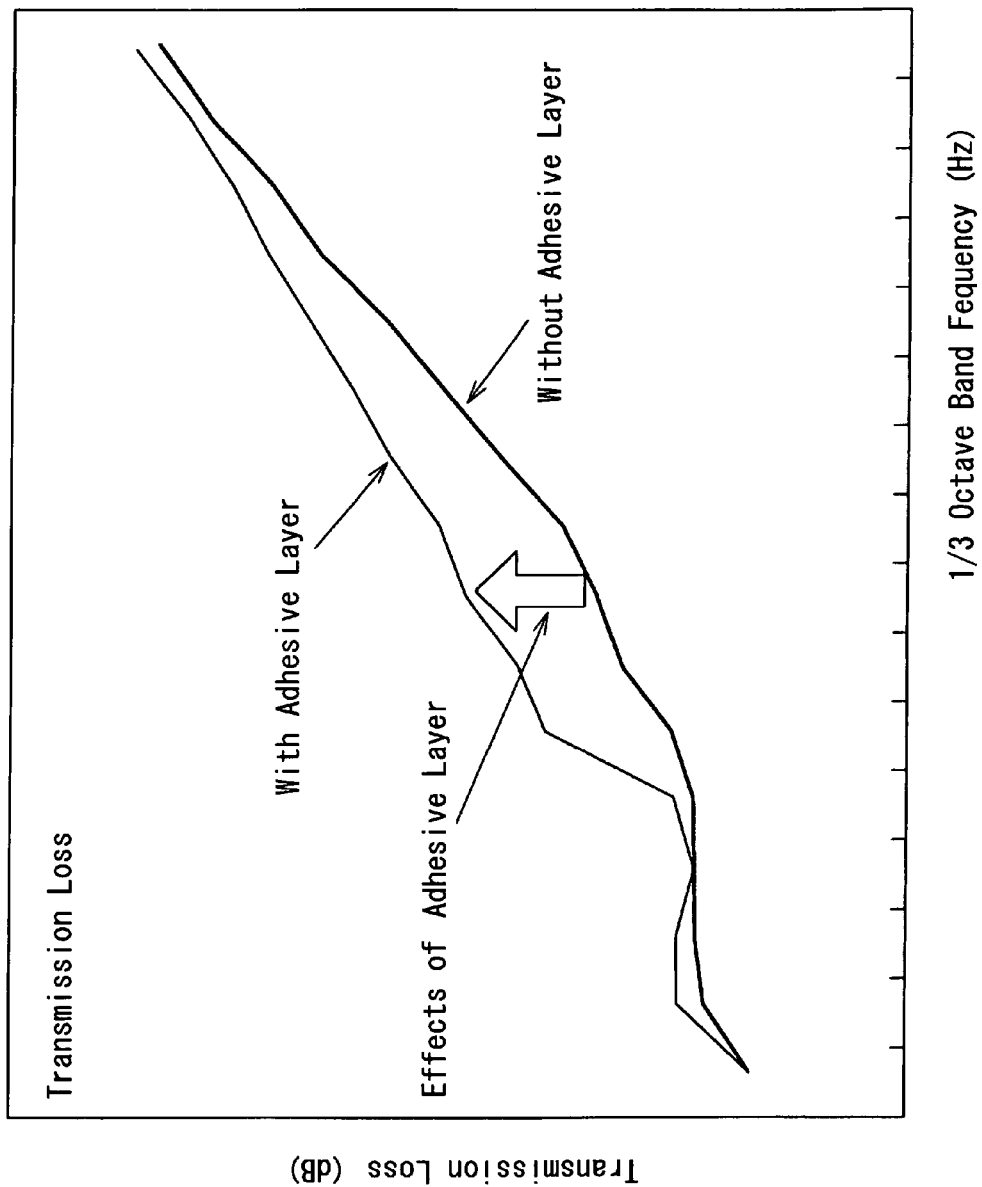
FIG. 18 is a graph showing frequency-transmission loss curves of the fourth embodiment.
Figure 19:
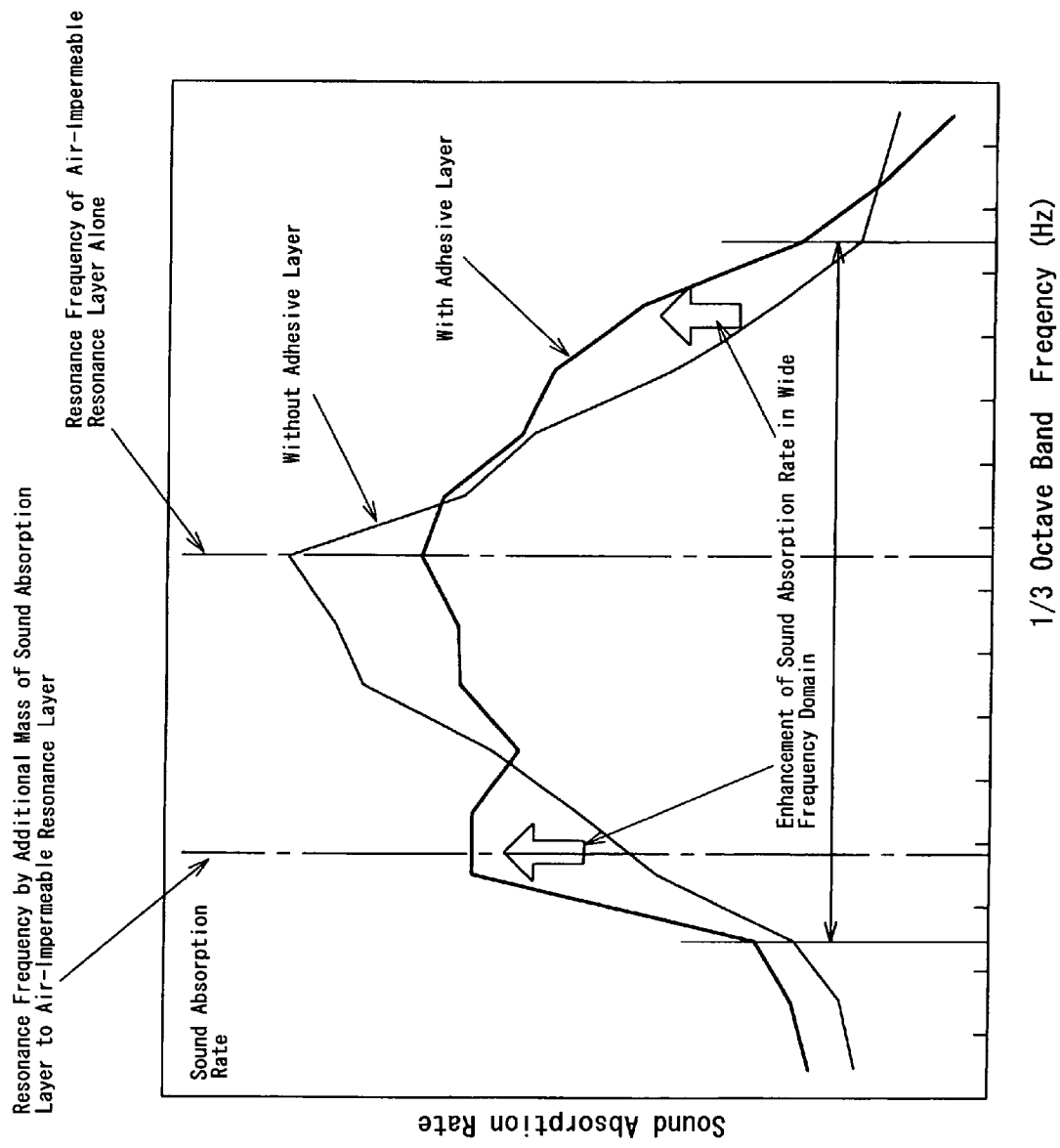
FIG. 19 is a graph showing frequency-sound absorption rate curves of the fourth embodiment.

The graph of FIG. 18 shows the effects of the adhesive layer 404 on the transmission loss. As clearly shown in the graph of FIG. 18, the presence of the adhesive layer 404 effectively enhances the transmission loss in the low frequency domain of 125 to 500 Hz. FIG. 19 shows the effects of the adhesive layer 404 on the sound absorption rate. As shown in the graph of FIG. 19, the structure without the adhesive layer 404 gives an extreme increase in sound absorption rate only in the medium frequency domain of 640 to 1250 Hz. The structure with the adhesive layer 404, on the other hand, gives an increase in sound absorption rate in a wide frequency domain including the low frequency domain of 125 to 500 Hz and the high frequency domain of 1600 to 6400 Hz, as well as the medium frequency domain of 640 to 1250 Hz. The principle is that, in the structure without the adhesive layer 404, the air-impermeable resonance layer 403 alone causes resonance in the medium frequency domain of 640 to 1250 Hz. In the structure with the adhesive layer 404, on the other hand, resonance arises in the low frequency domain of 125 to 500 Hz, simultaneously with the resonance in the medium frequency domain of 640 to 1250 Hz.

Example 4

The structure of Example 4 had the mono-layer first sound absorption layer 402, in place of the multi-layer first sound absorption layer 302 of Example 3. The first sound absorption layer 402 was made of thermoplastic felt (of reused synthetic fibers and PE fibers with PET used as binding fibers) and had a density of 0.04 g/cm$^3$, a thickness of 5 mm, an area-weight of 200 g/m$^2$, and an initial compression repulsive force of 50 N.

Fifth Embodiment

Figure 20:
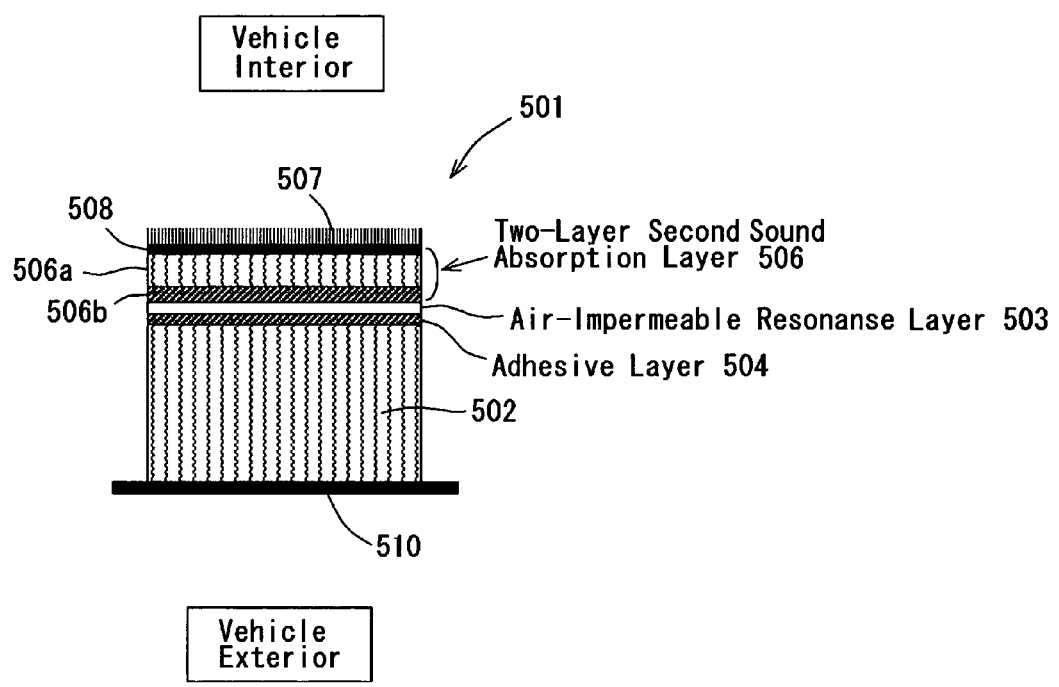
FIG. 20 shows the basic structure of a floor silencer 501 in a fifth embodiment.

A floor silencer 501 of a fifth embodiment shown in FIG. 20 is fixed to an iron floor panel 510, which parts the vehicle interior from the vehicle exterior, and is arranged along the inner wall of the vehicle interior. The floor silencer 501 is designed to be ultra light in weight for the enhanced fuel efficiency and the easy attachment but to still have sufficient sound absorption properties. In the floor silencer 501 of the fifth embodiment, the vehicle interior, a surface/backing layer 507, a multi-layer second sound absorption layer 506, an air-impermeable resonance layer 503, an adhesive layer 504, a sound absorption layer 502, a floor panel 510 as the vehicle body, and the vehicle exterior are arranged in this order. The sound absorption layer 502 is bonded to the floor panel 510, and the air-impermeable resonance layer 503 is located on the side of the vehicle interior.

The floor silencer 501 of the fifth embodiment has partly identical physical properties with those of the dash silencer 401 of the fourth embodiment. Only different physical properties are given here. The sound absorption layer 502 has a thickness in a range of 5 to 100 mm. The air-impermeable resonance layer 503 has an area-weight of not greater than 600 g/m$^2$ or more preferably of not greater than 300 g/m$^2$. The air-impermeable resonance layer 503 has a thickness in a range of 10 to 600 μm or more preferably in a range of 20 to 300 μm in the case of film. The second sound absorption layer 506 has a density in a range of 0.01 to 0.2 g/m$^3$ or more preferably in a range of 0.05 to 0.15 g/cm$^2$.

The surface/backing layer 507 is made of a surface material and a backing material, for example, polyethylene, EVA (ethylene vinyl acetate copolymer), or SBR (styrene-butadiene copolymer rubber). The second sound absorption layer 506 may have either a mono-layer structure or a multi-layer structure. In the illustrated structure of FIG. 20, the second sound absorption layer 506 has a two-layer structure including an upper layer 506a and a lower layer 506b.

The top face of the upper layer 506a is bonded to the surface/backing layer 507 via the adhesive layer 508. The bottom face of the upper layer 506a is bonded to or simply laid on the lower layer 506b. The lower layer 506b is made of hard sheet produced by compression of felt. The bottom face of the lower layer 506b is bonded to the air-impermeable resonance layer 503. The upper layer 506a is made of a sound absorbing material to enhance the sound absorption in the high frequency domain, while utilizing the elastic resonance of the lower layer 506b to enhance the sound absorption in the high frequency domain. The lower layer 506b and the sound absorption layer 502 utilize the rigid resonance and the elastic resonance of the lower layer 506b to enhance the sound absorption respectively in the medium frequency domain and in the high frequency domain. The lower layer 506b and the air-impermeable resonance layer 503 utilize the mass of the lower layer 506b to enhance the sound insulation.

Example 5-1

In the structure of Example 5-1 shown in FIG. 20, the surface/backing layer 507 had an area-weight of 350 g/m$^2$, the upper layer 506a was made of felt and had a thickness of 5 to 15 mm, and the lower layer 506b was made of hard sheet and had a thickness of 2 to 5 mm. The air-impermeable resonance film layer 503 had the thickness of 300 μm. The adhesive layer 504 was made of an olefin adhesive material. The sound absorption layer 502 was made of felt of blend of thermoplastic polyester, acryl, and cotton fibers or others and had a thickness of 10 mm. The structure of Example 5-1 also had an augmentation 509, for example, PP or PE bead foam or RSPP compression molded object of 5 to 50 mm in thickness. The filmed hard sheet layer 506b has an area-weight of 350 g/m$^2$.

FIG. 21(a) shows the structure of a floor silencer 501a of Comparative Example 1. The floor silencer 501a of Comparative Example 1 has a surface/PE backing layer 507d, a hard sheet layer 506e, a felt layer 503f, and an augmentation layer 509a. The surface/PE backing layer 507d, the hard sheet layer 506e, and the felt layer 503f are often bonded in advance to be integrated. The augmentation layer 509a may be separate from the other layers for the convenience of assembly of the vehicle. This structure of Comparative Example 1 hardly has sound absorption effects in the vehicle interior, while the surface/PE backing layer 507d has some sound insulation effects to insulate noise incoming from the vehicle exterior.

Figure 28:
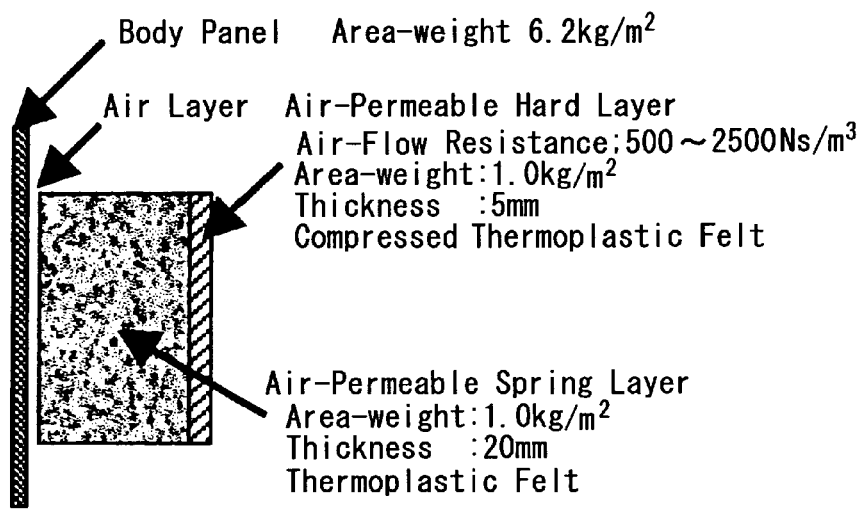
FIG. 28 shows a sound insulation structure disclosed in Patent Document 1.
Figure 29:
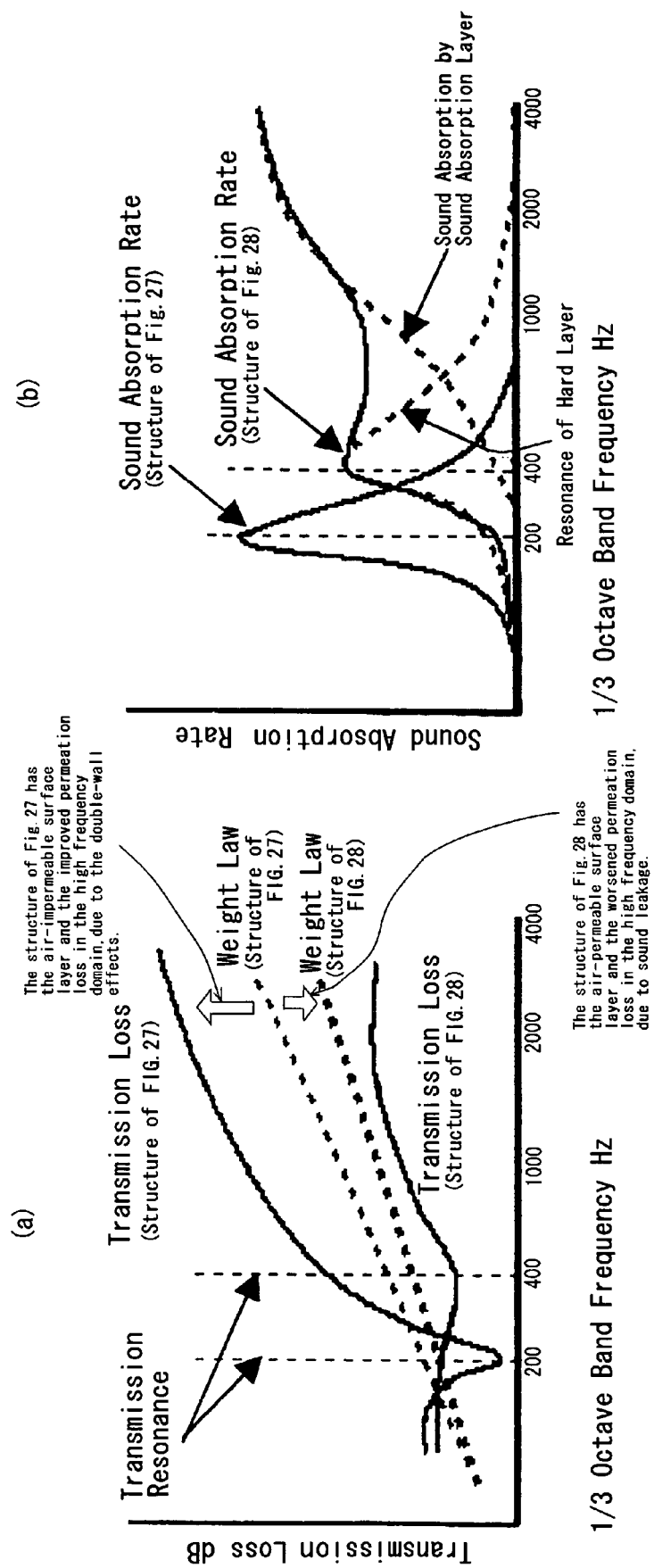
FIG. 29(a) is a graph showing frequency-transmission loss curves with regard to the prior art sound insulation structure shown in FIG. 27 and the sound insulation structure of Patent Document 1 shown in FIG. 28
FIG. 29(b) is a graph showing frequency-sound absorption rate curves with regard to the prior art sound insulation structure shown in FIG. 27 and the sound insulation structure of Patent Document 1 shown in FIG. 28
Figure 30:
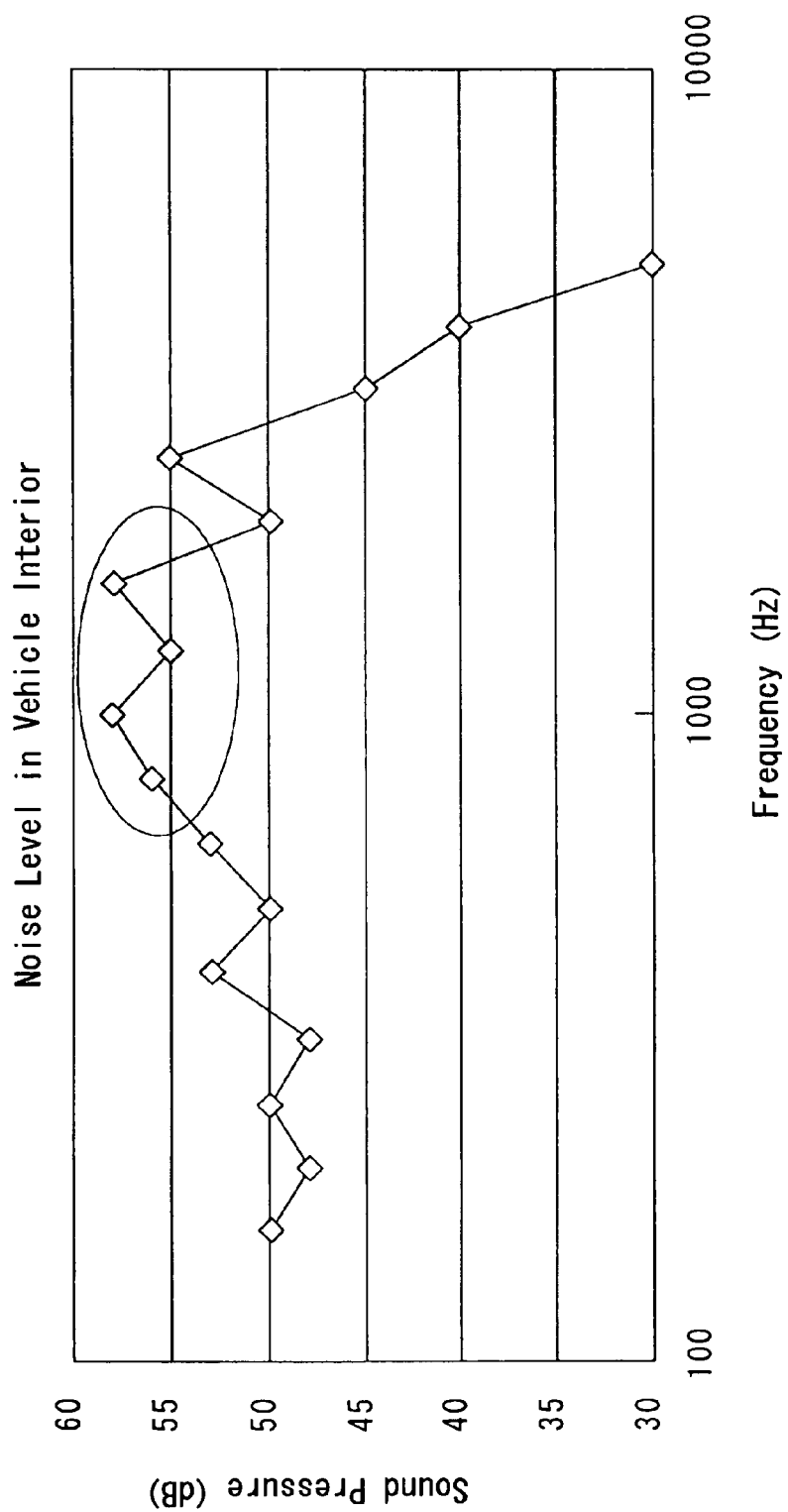
FIG. 30 is a graph showing a variation in noise level in vehicle interior.
Figure 31:
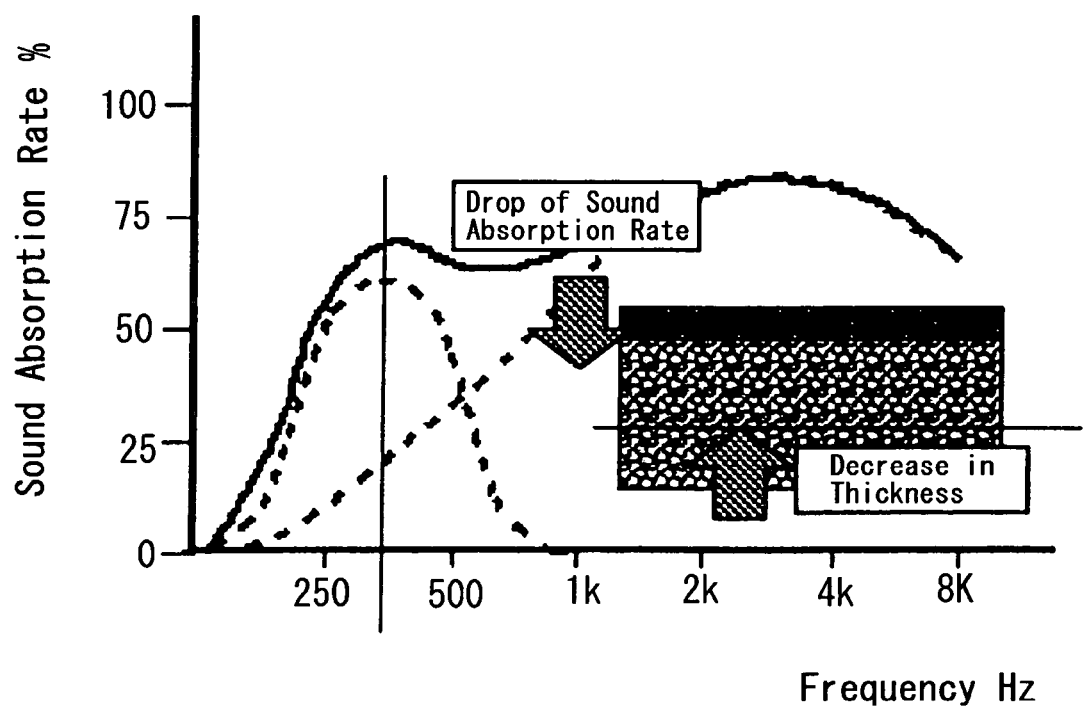
FIG. 31 is a graph showing a frequency-sound absorption rate curve in Patent Document 2.

FIG. 21(b) shows the structure of a floor silencer 501b of Comparative Example 2 according to the structure of FIG. 28. The floor silencer 501b of Comparative Example 2 has a surface/PE backing layer 507g, a hard sheet layer 506h, a felt layer 503i, and an augmentation layer 509b. This structure regulates the air permeation through the hard sheet layer 506h, thereby ensuring sound insulation of noise incoming from the vehicle exterior, as well as sound absorption in the vehicle interior. The air permeation, however, reduces the sound insulation effects. FIG. 21(c) shows the structure of a floor silencer 501' as Example of the fifth embodiment. The floor silencer 501' as Example of the fifth embodiment has a surface/backing layer 507', a hard sheet layer 506', an air-impermeable resonance film layer 503', an adhesive layer 504', a felt layer 502', and an augmentation layer 509'. The hard sheet layer 506' and the air-impermeable resonance film layer 503' are almost wholly bonded to each other. This structure also ensures sound insulation of noise incoming from the vehicle exterior, as well as sound absorption in the vehicle interior. The structure of the fifth embodiment additionally utilizes the elastic resonance and the rigid resonance to attain the better sound absorption rate and the higher sound insulation power of the air-impermeable resonance film layer 503'.

As shown in FIG. 22(*a*), the transmission loss of Example of the fifth embodiment is improved, compared with Comparative Examples 1 and 2, especially Comparative Example 2. As shown in FIG. 22(*b*) the sound absorption rate of Example of the fifth embodiment is also improved, compared with Comparative Examples 1 and 2, especially Comparative Example 1. This effect is ascribed to the presence of the film layer 503.

In one modification of the fifth embodiment, the upper layer 506*a* may be a perforated air-impermeable film, which has a thickness of 30 to 400 μm or more preferably of 200 μm and is made of an olefin like PE or PP, with the lower layer 506*b* being made of felt, instead of the hard sheet. The upper layer 506*a* and the lower layer 506*b* are joined with each other by needle punching. FIGS. 23(*a*) and 23(*b*) show the effects of the perforated air-impermeable film. The presence of the perforated air-impermeable film enhances both the transmission loss and the second absorption rate. The value of transmission loss of FIG. 23(*a*) was decided assuming the transmission loss of a 0.8 mm iron plate to be 0 dB.

Example 5-2

In the structure of Example 5-2, the surface/backing layer 507 had an area-weight of 350 g/m$^2$, the upper layer 506*a* was made of an air-impermeable film and had a thickness of 200 μm, the hard sheet layer 506 was a compression molded object of thermoplastic felt and had a thickness of 5 mm, and the film layer 503 was made of PE film and had a thickness of 300 μm. The adhesive layer 504 was made of an olefin adhesive, the felt layer 502 was made of thermoplastic felt of mainly polyester fibers and had a thickness of 10 mm, and the augmentation layer 509 was made of PP bead foam and had a thickness of 5 to 40 mm. The filmed hard sheet layer 506 had an area-weight of 350 g/m$^2$.

Sixth Embodiment

Figure 24:
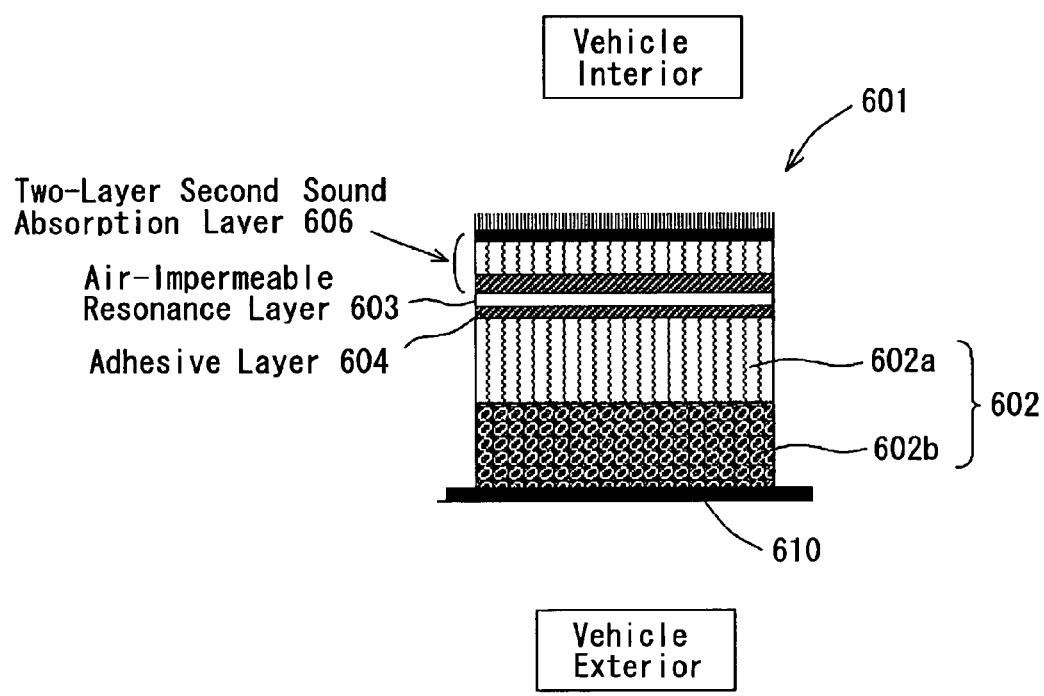
FIG. 24 shows the basic structure of a floor silencer 601 in a sixth embodiment of the invention.

FIG. 24 shows a floor silencer 601 of a sixth embodiment. The structure of the floor silencer 601 of the sixth embodiment is similar to that of the floor silencer 501 of the fifth embodiment discussed above, except that a sound absorption layer 602 includes a high-density sound absorption layer 602*a* and a low-density sound absorption layer 602*b*. The high-density sound absorption layer 602*a* and the low-density sound absorption layer 602*b* have partly identical physical properties with those of the high-density sound absorption layer 302*a* and the low-density sound absorption layer 302*b* of the dash silencer 301 of the third embodiment shown in FIG. 10(*b*). Only different physical properties are given here. The high-density sound absorption layer 602*a* has a thickness in a range of 2 to 70 mm and an initial compression repulsive force in a range of 30 to 600 N or more preferably in a range of 50 to 300 N. The low-density sound absorption layer 602*b* has a thickness in a range of 2 to 70 mm and an initial compression repulsive force in a range of 5 to 300 N or more preferably in a range of 10 to 100N.

Example 6

The structure of Example 6 had the high-density sound absorption layer 602*a* and the low-density sound absorption layer 602*b*, in place of the sound absorption layer 502 of Example 5-1. The high-density sound absorption layer 602*a* was made of thermoplastic felt (of reused synthetic fibers and PE fibers with PET used as binding fibers) and had a density of 0.100 g/cm$^3$, a thickness of 10 mm, an area-weight of 1000 g/m$^2$, and an initial compression repulsive force of 300 N. The low density sound absorption layer 602*b* was made of cotton fiber felt and had a density of 0.04 g/cm$^3$, a thickness of 10 mm, an area-weight of 400 g/m$^2$, and an initial compression repulsive force of 100 N. The adhesive force of the adhesive layer 604 was 5 N/25 mm. The high-density sound absorption layer 602*a* and the low-density sound absorption layer 602*b* may be made of PET felt and joined together by needle punching.

The air permeability is measured with a Frazil-type air permeability tester in conformity with JIS L1018 8.3.3.1 concerning air permeability of knitted fabrics or an equivalent air permeability tester having extremely high correlativity.

Figure 25:
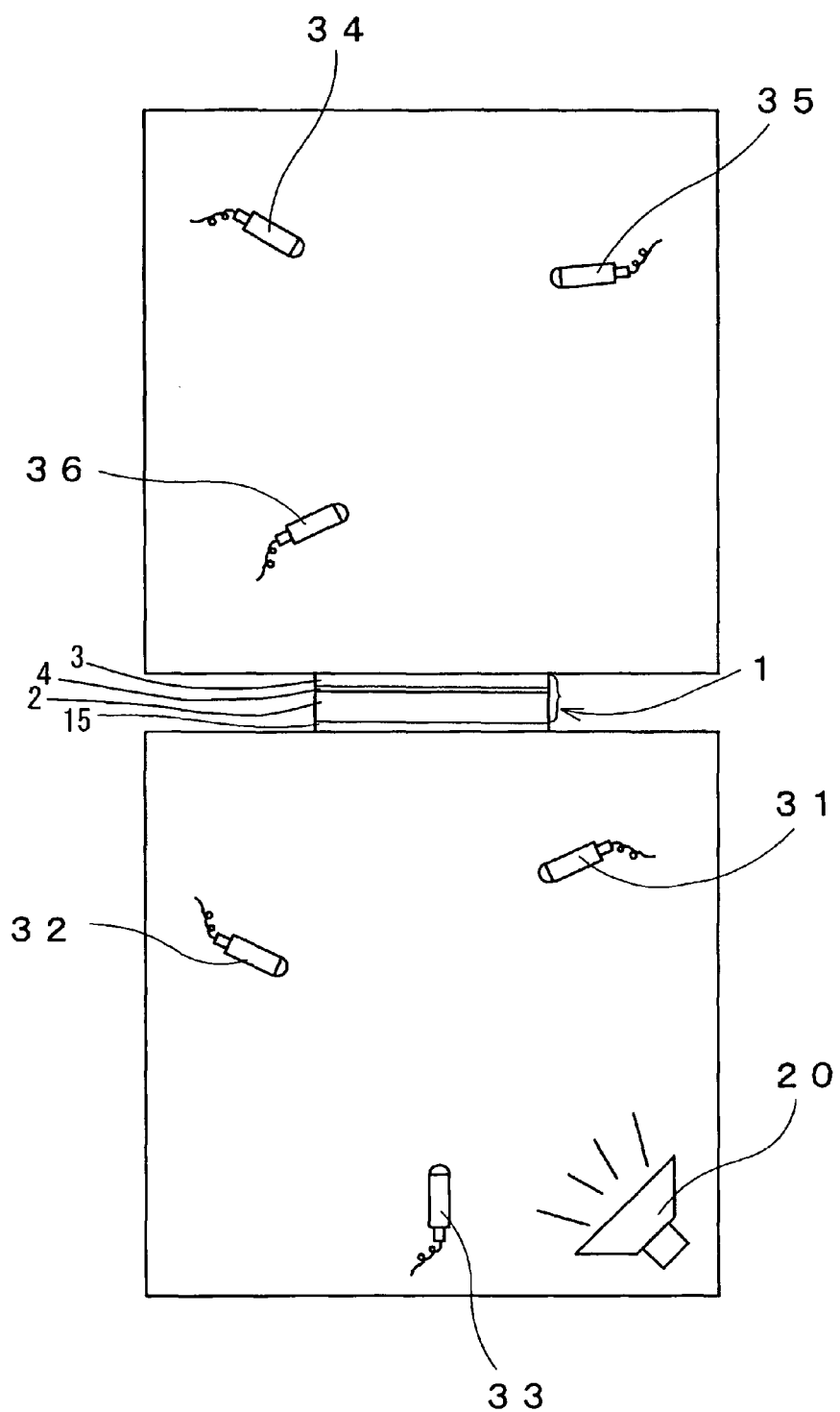
FIG. 25 is a plan view showing a measurement system of transmission loss.

Measurement of the transmission loss follows JIS A 1409. But the size of each sample was 1 m$^2$, instead of 10 m$^2$. FIG. 25 is a plan view showing a measurement chamber of the transmission loss, where a speaker 20 and microphones 31 through 36 are set in the measurement chamber and each sample, such as the dash silencer 1, is located on the wall of the measurement chamber.

Figure 26:
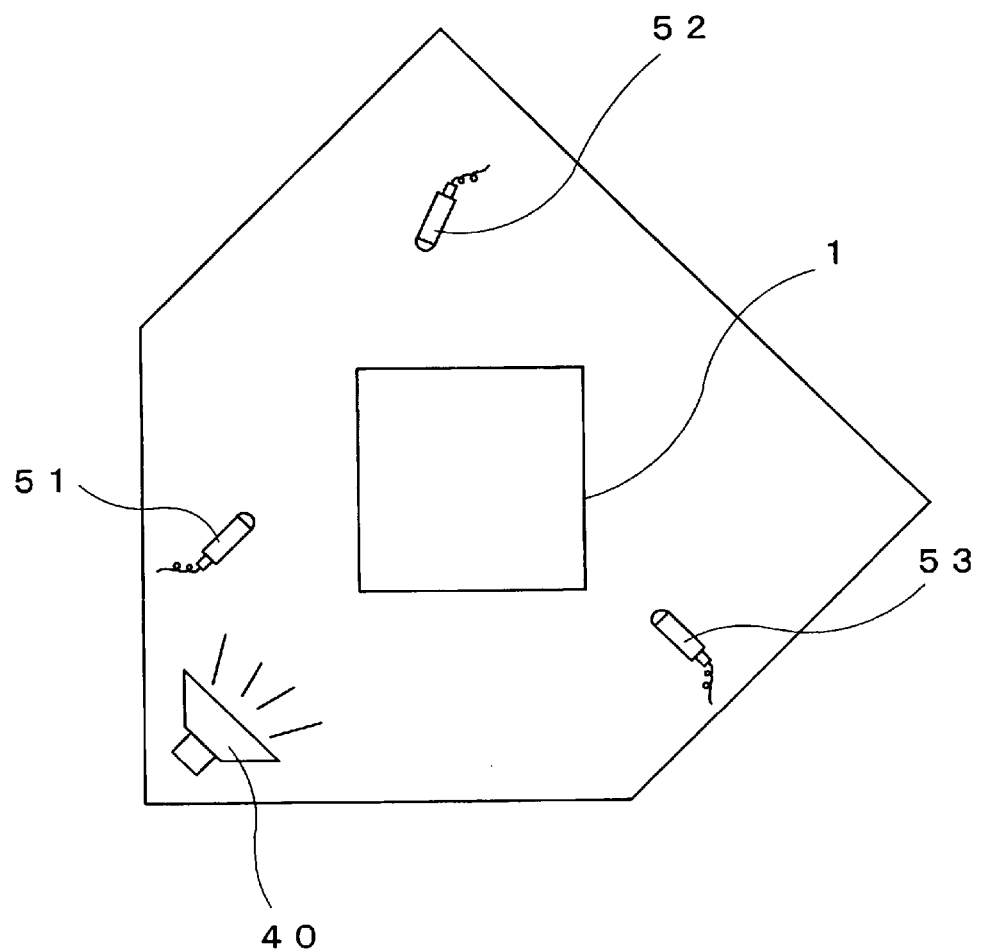
FIG. 26 is a plan view showing a measurement system of sound absorption rate.
Figure 27:
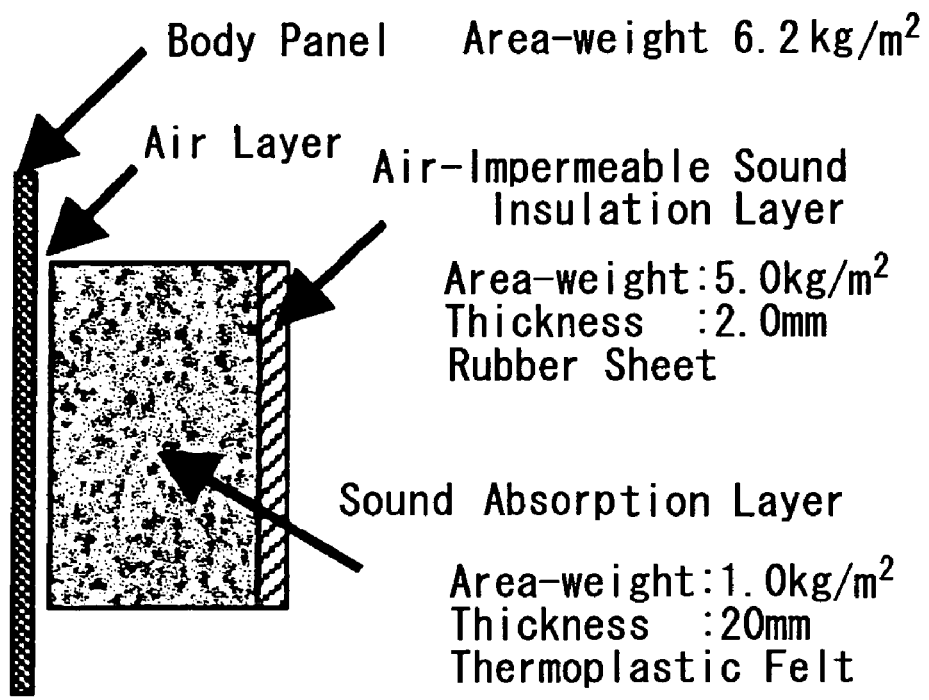
FIG. 27 shows a prior art sound insulation structure.

Measurement of the sound absorption rate follows JIS A 1416 (sound absorption in a reverberation chamber). But the size of each sample was 1 m$^2$, instead of 10 m$^2$. FIG. 26 is a plan view showing a measurement chamber of the sound absorption rate, where a speaker 40 and microphones 51 through 53 are set in the measurement chamber and each sample, such as the dash silencer 1, is located on the floor of the measurement chamber.

The embodiments and their examples discussed above are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. An ultra-light sound insulator, comprising:
a sound absorption layer that is light in weight and has a thickness in a range of 1 to 50 mm, the thickness varying from one region to another in a range not greater than 50 mm, and a density in a range of 0.01 to 0.2 g/cm$^3$; and
an air-impermeable resonance layer in the form of a film having a thickness in a range of 10 to 200 μm that is bonded to said sound absorption layer via an adhesive layer and has an area-weight of not greater than 200 g/m$^2$,
wherein an adhesion strength of said adhesive layer against said sound absorption layer and said air-impermeable resonance layer is set in a range of 1 to 20 N/25 mm under conditions of a peel angle of 180 degrees and a peel width of 25 mm,
an adhesion area of said adhesive layer is 50 to 100% of a whole interface between said sound absorption layer and said air-impermeable resonance layer so that resonance due to a total mass of said air-impermeable resonance layer and said sound absorption layer occurs in addition to membrane resonance of said air-impermeable resonance layer, and said sound absorption layer is adapted to face to a vehicle body panel, while said air-impermeable resonance layer is adapted to face to a vehicle interior.

2. An ultra-light sound insulator in accordance with claim 1, wherein said sound absorption layer has an initial compression repulsive force in a range of 2 to 200 N.

3. An ultra-light sound insulator in accordance with claim 1, wherein said sound absorption layer a density in a range of 0.03 to 0.08 g/cm$^3$.

4. An ultra-light sound insulator in accordance with claim 1, wherein said adhesion strength of said adhesive layer against said sound absorption layer and said air-impermeable resonance layer is set in a range of 3 to 10 N/25 mm under conditions of a peel angle of 180 degrees and a peel width of 25 mm.

5. An ultra-light sound insulator in accordance with claim 1, wherein said adhesion area of said adhesive layer is 80 to 100% of a whole interface between said sound absorption layer and said air-impermeable resonance layer.

6. An ultra-light sound insulator in accordance with claim 1, wherein said sound absorption layer a density in a range of 0.03 to 0.08 g/cm$^3$, said air-impermeable resonance layer has an area-weight of not greater than 300 g/m$^2$, said adhesion strength of said adhesive layer against said sound absorption layer and said air-impermeable resonance layer is set in a range of 3 to 10 N/25 mm under conditions of a peel angle of 180 degrees and a peel width of 25 mm and said adhesion area of said adhesive layer is 80 to 100% of a whole interface between said sound absorption layer and said air-impermeable resonance layer.

7. An ultra-light sound insulator in accordance with claim 1, wherein said sound absorption layer has an initial compression repulsive force in a range of 20 to 100 N.

8. An ultra-light sound insulator in accordance with claim 1, wherein the thickness of said sound absorption layer is in a range of 5-40 mm.

* * * * *